(12) United States Patent
Yoshida

(10) Patent No.: US 11,288,026 B2
(45) Date of Patent: Mar. 29, 2022

(54) JOB PROCESSING APPARATUS, METHOD FOR CONTROLLING JOB PROCESSING APPARATUS, AND STORAGE MEDIUM

(71) Applicant: CANON KABUSHIKI KAISHA, Tokyo (JP)

(72) Inventor: Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/187,395

(22) Filed: Feb. 26, 2021

(65) Prior Publication Data

US 2021/0182006 A1    Jun. 17, 2021

Related U.S. Application Data

(63) Continuation of application No. 16/680,372, filed on Nov. 11, 2019, now Pat. No. 10,949,151.

(30) Foreign Application Priority Data

Nov. 16, 2018    (JP) .............................. JP2018-215640

(51) Int. Cl.
*G06F 3/12* (2006.01)
*H04N 1/00* (2006.01)

(52) U.S. Cl.
CPC .......... *G06F 3/1273* (2013.01); *G06F 3/1208* (2013.01); *G06F 3/1234* (2013.01); *H04N 1/00477* (2013.01)

(58) Field of Classification Search
CPC .... G06F 3/1273; G06F 3/1234; G06F 3/1208; H04N 1/00477

USPC ........................................................ 358/1.13
See application file for complete search history.

(56) References Cited

U.S. PATENT DOCUMENTS

| | | | | |
|---|---|---|---|---|
| 7,813,816 B2 ‡ | 10/2010 | Fulton | ................. | G05B 19/054 |
| | | | | 700/11 |
| 8,373,873 B2 ‡ | 2/2013 | Negishi | ................. | G06F 3/1256 |
| | | | | 358/1.14 |
| 10,074,076 B2 ‡ | 9/2018 | Weiss | ..................... | G16H 10/60 |
| 2003/0222396 A1 ‡ | 12/2003 | Kurahashi | ............. | B65H 39/00 |
| | | | | 271/207 |
| 2005/0185973 A1 ‡ | 8/2005 | Hama | .................. | G03G 15/556 |
| | | | | 399/27 |

(Continued)

FOREIGN PATENT DOCUMENTS

| | | |
|---|---|---|
| CN | 107797773 A | 3/2018 |
| CN | 108377311 A | 8/2018 |

*Primary Examiner* — Allen H Nguyen
(74) *Attorney, Agent, or Firm* — Canon U.S.A., Inc. IP Division

(57) ABSTRACT

A user is enabled to check a history of job execution by viewing records arranged in chronological order and to easily check the specific description of an error by viewing an error record. The job processing apparatus control method includes executing a job, displaying a plurality of history records with the plurality of history records being arranged side by side in chronological order, the plurality of history records each indicating a history of a job executed in the executing, and detecting an error. In response to an error having been detected in the detecting, an error record is displayed with the error record and the plurality of history records being arranged side by side, the error record indicating the error.

21 Claims, 26 Drawing Sheets

(56) References Cited

U.S. PATENT DOCUMENTS

| | | | |
|---|---|---|---|
| 2006/0171513 A1* | 8/2006 | Yoshida | H04N 1/00432 |
| | | | 379/88.13 |
| 2008/0184076 A1‡ | 7/2008 | Yamazaki | G06F 11/30 |
| | | | 714/47.1 |
| 2009/0059286 A1* | 3/2009 | Yamaguchi | H04N 1/00472 |
| | | | 358/1.15 |
| 2016/0224948 A1‡ | 8/2016 | Morishita | G06Q 10/20 |
| 2017/0013139 A1* | 1/2017 | Suzuki | G06F 3/1288 |
| 2018/0255186 A1 | 9/2018 | Takeo | |

\* cited by examiner

‡ imported from a related application

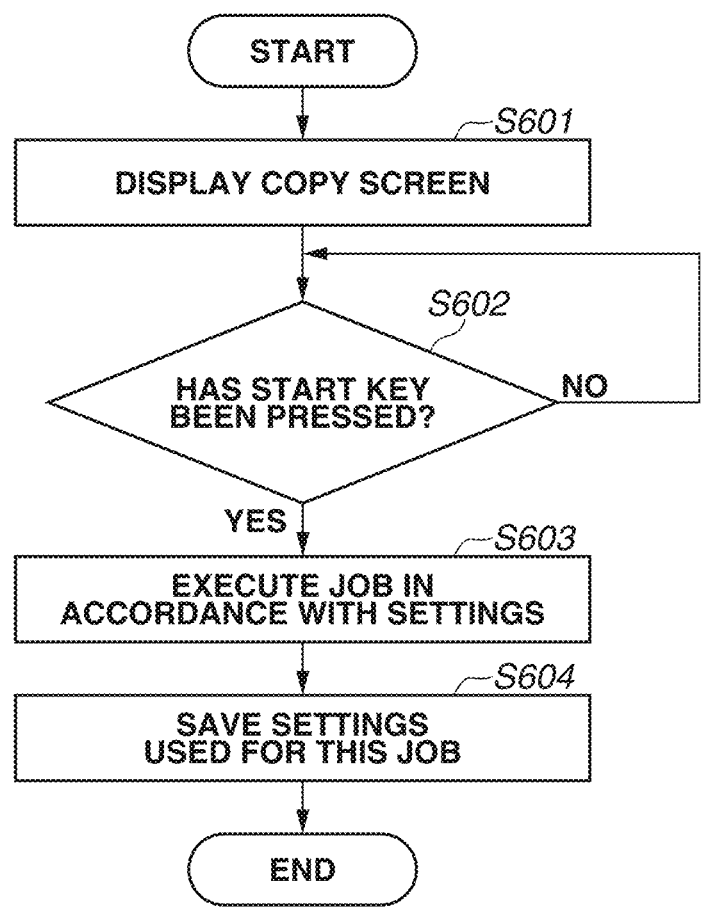

| Type | Setting Values | | | | | |
|---|---|---|---|---|---|---|
| | Number of Copies | Color Selection | Paper Selection | Pages Per Sheet | 2-Sided | Facing Pages into 2 Pages | Copy Ratio | etc... |
| Default Settings | 1 Copies | Black-and-White | Automatic Feed | 1 in 1 | 1-Sided | OFF | 100% | ... |
| Settings for Current Job | 2 Copies | Color | Automatic Feed | 1 in 1 | 2-Sided | OFF | 100% | ... |

| Type | Setting Values | | | | | | | |
|---|---|---|---|---|---|---|---|---|
| | Number of Copies | Color Selection | Paper Selection | Pages Per Sheet | 2-Sided | Facing Pages into 2 Pages | Copy Ratio | etc... |
| Default Settings | 1 Copies | Black-and-White | Automatic Feed | 1 in 1 | 1-Sided | OFF | 100% | ... |
| Settings for Current Job | 5 Copies | Color | Automatic Feed | 1 in 1 | 2-Sided | OFF | 100% | ... |

| Type | Setting Values | | | | | | | |
|---|---|---|---|---|---|---|---|---|
| | Number of Copies | Color Selection | Paper Selection | Pages Per Sheet | 2-Sided | Facing Pages into 2 Pages | Copy Ratio | etc... |
| Default Settings | 1 Copies | Black-and-White | Automatic Feed | 1 in 1 | 1-Sided | OFF | 100% | ... |
| custom01.xml | 2 Copies | Color | Automatic Feed | 2 in 1 | 2-Sided | ON | 400% | ... |

FIG. 12D 806
807

| Type | Setting Values | | | | | | | |
|---|---|---|---|---|---|---|---|---|
| | Number of Copies | Color Selection | Paper Selection | Pages Per Sheet | 2-Sided | Facing Pages into 2 Pages | Copy Ratio | etc... |
| custom01.xml | 2 Copies | Black-and-White | Automatic Feed | 1 in 1 | 1-Sided | OFF | 100% | ... |
| Settings for Current Job | 6 Copies | Black-and-White | Automatic Feed | 2 in 1 | 1-Sided | ON | 400% | ... |

FIG.14A

| Button ID | Application ID | Data Type | Data | Text to Display | |
|---|---|---|---|---|---|
| | | | | Date And Time | Setting Value |
| | | | | | |
| | | | | | |
| | | | | | |
| | | | | | |
| | | | | | |
| | | | | | |
| | | | | | |

| Button ID | Application ID | Data Type | Data | Text to Display | |
|---|---|---|---|---|---|
| | | | | Date And Time | Setting Value |
| 1001 | 101 | Setting | data1.xml | 2016/12/15 13:01:22 | 2 Copies, Color, 2-Sided |
| | | | | | |
| | | | | | |
| | | | | | |
| | | | | | |
| | | | | | |
| | | | | | |

| Button ID | Application ID | Data Type | Data | Text to Display | |
|---|---|---|---|---|---|
| | | | | Date And Time | Setting Value |
| 1001 | 101 | Setting | data1.xml | 2016/12/15 13:01:22 | 2 Copies, Color, 2-Sided |
| 1002 | 101 | Setting | data2.xml | 2016/12/16 15:38:16 | 5 Copies, Color, 2-Sided |
| | | | | | |
| | | | | | |
| | | | | | |
| | | | | | |
| | | | | | |

| Button ID | Application ID | Data Type | Data | Text to Display | |
|---|---|---|---|---|---|
| | | | | Date And Time | Setting Value |
| 1002 ~ 1001 | 101 | Setting | data1.xml | 2016/12/15 13:01:22 | 2 Copies, Color, 2-Sided |
| 1003 ~ 1002 | 101 | Setting | data2.xml | 2016/12/16 15:38:16 | 5 Copies, Color, 2-Sided |
| 1004 ~ 1003 | 201 | Setting | data2.xml | 2016/12/17 15:38:16 | inoue@xxxxxxxxx.co.jp, 1 Mail, A4, Automatic (Color/Monochrome) |
| | | | | | |
| | | | | | |
| | | | | | |
| | | | | | |

FIG.14E

| Button ID | Application ID | Data Type | Data | Text to Display | |
|---|---|---|---|---|---|
| | | | | Date And Time | Setting Value |
| 1003 ~ 1001 | 101 | Setting | data2.xml | 2016/12/16 15:38:16 | 5 Copies, Color, 2-Sided |
| 1004 ~ 1002 | 201 | Setting | data2.xml | 2016/12/17 15:38:16 | inoue@xxxxxxxxx.co.jp, 1 Mail, A4, Automatic (Color/Monochrome) |
| 1005 ~ 1003 | 101 | Setting | data1.xml | 2016/12/18 12:54:30 | 2 Copies, Color, 2-Sided |
| | | | | | |
| | | | | | |
| | | | | | |
| | | | | | |

FIG.15A

| Button ID | Application ID | Data Type | Data | Text to Display | |
|---|---|---|---|---|---|
| | | | | Date And Time | Setting Value |
| 1001 | 101 | Setting | data2.xml | 2016/12/16 15:38:16 | 5 Copies, Color, 2-Sided |
| 1002 | 201 | Setting | data2.xml | 2016/12/17 15:38:16 | inoue@xxxxxxxxx.co.jp, 1 Mail, A4, Automatic (Color/Monochrome) |
| 1003 | 101 | Setting | data1.xml | 2016/12/18 12:54:30 | 2 Copies, Color, 2-Sided |
| 1004 | 100 | Warning | FAXLINE_ERROR.xml | 2016/12/18 16:24:22 | Please check FAX line |

| Button ID | Application ID | Data Type | Data | Text to Display | |
|---|---|---|---|---|---|
| | | | | Date And Time | Setting Value |
| 1001 | 101 | Setting | data2.xml | 2016/12/16 15:38:16 | 5 Copies, Color, 2-Sided |
| 1002 | 201 | Setting | data2.xml | 2016/12/17 15:38:16 | inoue@xxxxxxxxx.co.jp, 1 Mail, A4, Automatic (Color/Monochrome) |
| 1003 | 101 | Setting | data1.xml | 2016/12/18 12:54:30 | 2 Copies, Color, 2-Sided |
| 1004 | 101 | Alert | STAPLEOVER.xml | 2016/12/18 16:24:22 | Too many sheets to staple |

| Button ID | Application ID | Data Type | Data | Text to Display | |
|---|---|---|---|---|---|
| | | | | Date And Time | Setting Value |
| 1001 | 101 | Setting | data2.xml | 2016/12/16 15:38:16 | 5 Copies, Color, 2-Sided |
| 1002 | 201 | Setting | data2.xml | 2016/12/17 15:38:16 | inoue@xxxxxxxxx.co.jp, 1 Mail, A4, Automatic (Color/Monochrome) |
| 1003 | 101 | Setting | data1.xml | 2016/12/18 12:54:30 | 2 Copies, Color, 2-Sided |
| 1004 | 101 | Suspended | NOPAPER.xml | 2016/12/18 16:24:22 | Job is suspended because paper has run out |

| Situation Category | State | State Category | Explanation ID |
|---|---|---|---|
| Execution | Being Executed | Normal | MSG_ID_FAXING |
| Execution | Completed With Execution | Normal | MSG_ID_FAX_COMP |
| Paper | Normal | Normal | |
| Paper | Suitable Paper Unavailable | Alert | MSG_ID_FAX_NOPAPER |
| ... | ... | ... | ... |
| Line | Normal | Normal | |
| Line | Suspended | Warning | MDG_ID_FAX_LINEOFF |
| ... | ... | ... | ... |

1401 — Line / Normal row
1402 — Line / Suspended row
1403, 1404 — column indicators
1405 — MDG_ID_FAX_LINEOFF

FIG.19B

| Situation Category | State | State Category | Explanation ID |
|---|---|---|---|
| Execution | Too Many Sheets to Staple | Alert | MSG_ID_COPY_STAPLEOVER |
| Execution | Execution Error | Warning | MSG_ID_COPY_ERROR |
| Execution | Completed With Execution | Normal | MSG_ID_COPY_COMP |
| Execution | Out of Paper | Suspended | MSG_ID_NOPAPER |
| ... | ... | ... | ... |

1406 — State column
1407 — Explanation ID column
1409 — Too Many Sheets to Staple row
1408 — Out of Paper row

FIG.20

| Explanation ID | JA | EN |
|---|---|---|
| ... | ... | ... |
| MDG_ID_FAX_LINEOFF | ファクス回線を確認してください。 | Please check the FAX Line. |
| MSG_ID_FAX_NOPAPER | 最適用紙がありません。 | Nopaper for FAX. |
| MSG_ID_FAX2GO | ファクスできます。 | Ready to FAX. |
| MSG_ID_FAXING | ファクス送信中です。 | Sending FAX. |
| ... | ... | ... |
| MSG_ID_COPING | コピー中です。 | Coping |
| MSG_ID_COPY_ERROR | コピーエラー | Error |
| MSG_ID_NOPAPER | 用紙なしで中断しています | NoPaper Pending. |
| MSG_ID_COPY_STAPLEOVER | ステープル枚数オーバーでした。 | Too many sheets to staple. |
| MSG_ID_COPY2GO | コピーできます。 | Ready to Copy. |
| ... | ... | ... |

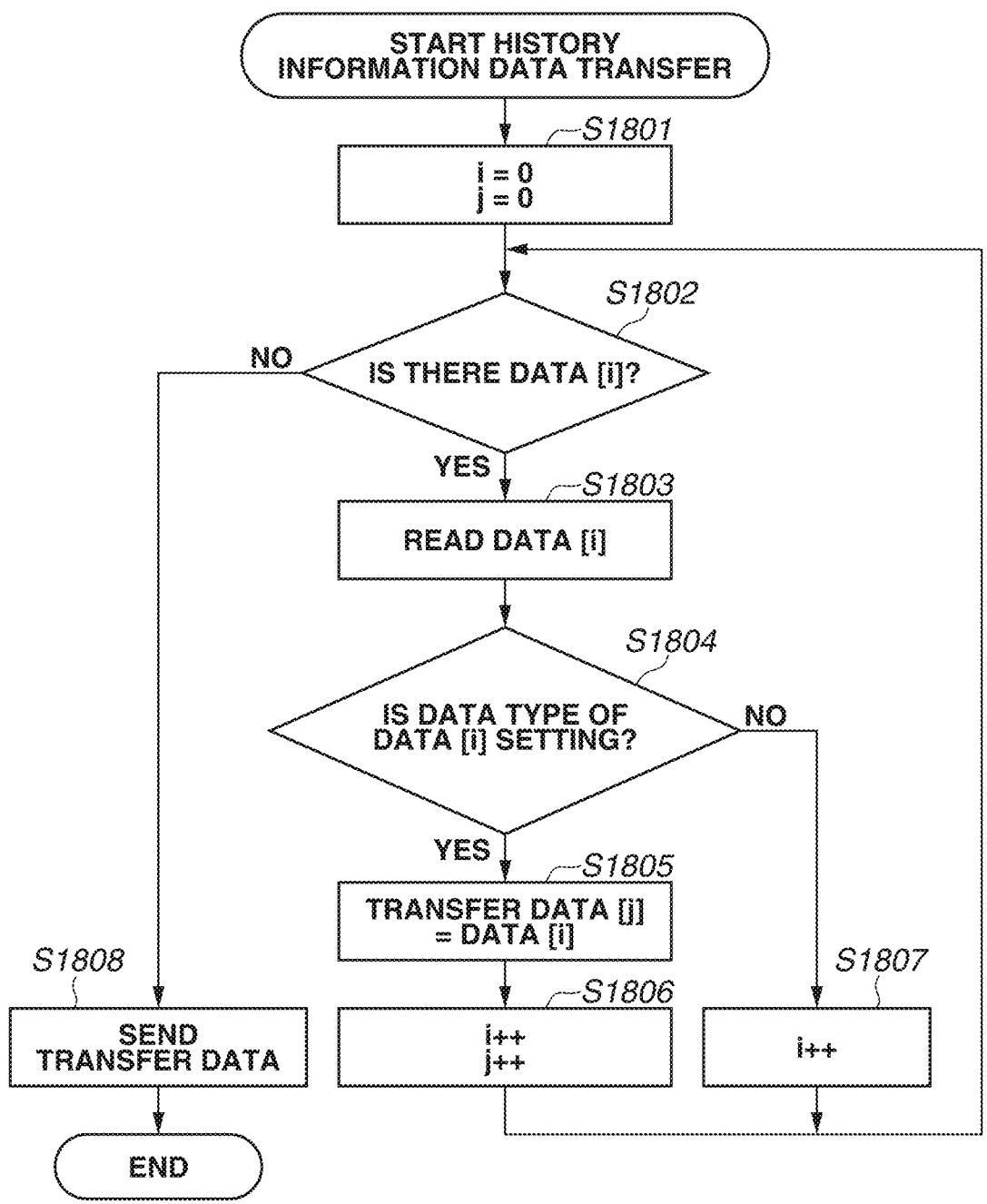

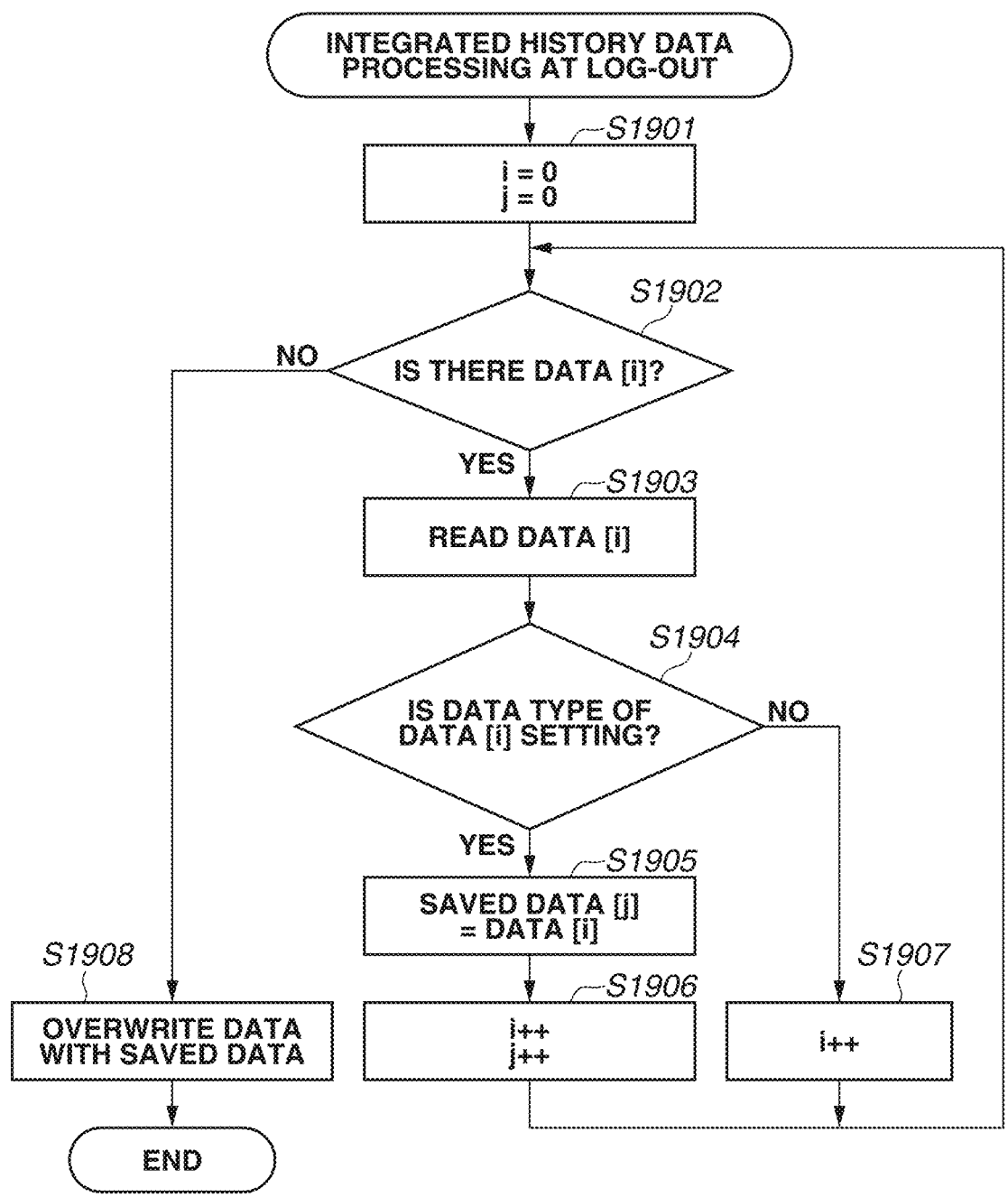

JOB PROCESSING APPARATUS, METHOD FOR CONTROLLING JOB PROCESSING APPARATUS, AND STORAGE MEDIUM

CROSS-REFERENCE TO RELATED APPLICATIONS

This application is a Continuation of U.S. patent application Ser. No. 16/680,372, filed Nov. 11, 2019, which claims the benefit of Japanese Patent Application No. 2018-215640, filed Nov. 16, 2018, both of which are hereby incorporated by reference herein in their entirety.

BACKGROUND

Field of the Disclosure

The present disclosure relates to a job processing apparatus, a method for controlling a job processing apparatus, and a storage medium.

Description of the Related Art

Typical job processing apparatuses that execute jobs and store records of the executed jobs have been available.

Examples of such job processing apparatuses include one that displays such records of jobs on a home screen for selecting therefrom the copy function and the send function, as discussed in Japanese Patent Application Laid-Open No. 2018-125686.

Thus displaying a list of the history records enables a user to easily check a history of jobs executed recently.

In typical techniques, job execution records can be displayed on a home screen. However, the user cannot check whether an error has occurred. Thus, the user may select a job record without recognizing that an error has occurred to the selected job. As a result, the selected job record is used for settings of a new job even though the error has occurred.

In that state, when a job execution instruction is received, the execution of the job may possibly be suspended because of the error.

SUMMARY

According to embodiments of the present disclosure, a job processing apparatus includes an execution unit configured to execute a job, a display unit configured to display a plurality of history records with the plurality of history records being arranged side by side in chronological order, the plurality of history records each indicating a history of a job executed by the execution unit, and a detection unit configured to detect an error. In response to the detection unit having detected an error, the display unit displays an error record with the error record and the plurality of history records being arranged side by side, the error record indicating the error.

Further features of the present disclosure will become apparent from the following description of exemplary embodiments with reference to the attached drawings.

BRIEF DESCRIPTION OF THE DRAWINGS

FIG. 9 is a flowchart of processing that is performed from when an application is started up to when the execution of a job is completed.

FIGS. 12A to 12D illustrate a data table saved in a memory area in the copy function.

FIGS. 14A to 14E illustrate a setting data table saved for the integrated history.

FIGS. 15A, 15B, and 15C illustrate a setting data table saved for the integrated history.

FIGS. 19A and 19B are schematic views of a situation explanation table from which a state category and text to display is obtained from among situation categories.

FIG. 20 illustrates a correspondence table between explanation IDs and display language text strings.

FIG. 23 is a flowchart of processing for history information data transfer.

FIG. 24 is a flowchart of processing for integrated history data processing at log-out.

DESCRIPTION OF THE EMBODIMENTS

Exemplary embodiments will be described below in detail with reference to the accompanying drawings. The following exemplary embodiments are not seen to be limited. It is not necessarily the case that all combinations of features described in the present exemplary embodiments are deemed to be essential.

Figure 1:
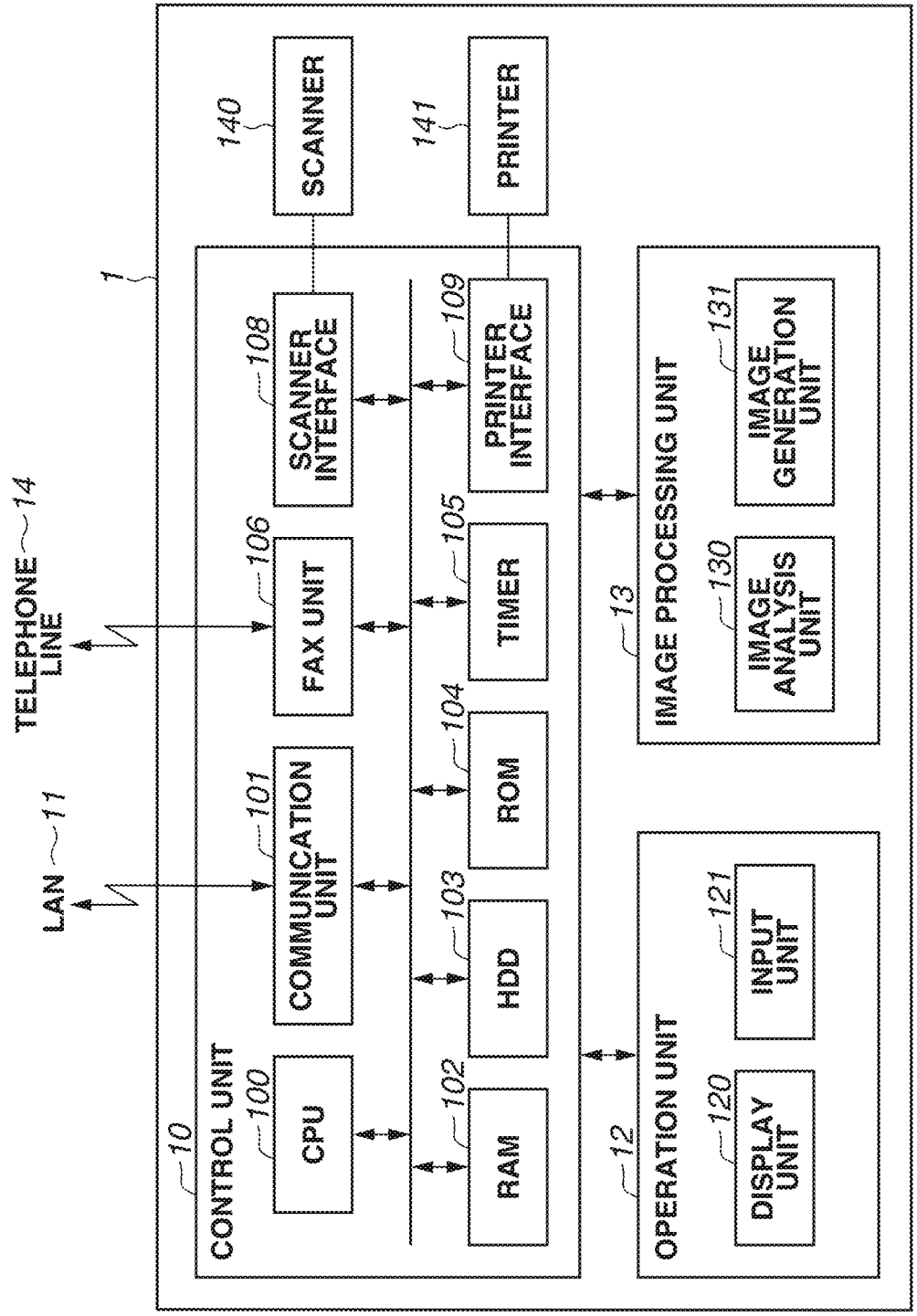
FIG. 1 is a block diagram illustrating a configuration of an image processing apparatus according to an exemplary embodiments.

A first exemplary embodiment of the present disclosure will be described below in detail. FIG. 1 is a block diagram illustrating the configuration of an image processing apparatus 1, which is an example of a job processing apparatus according the present exemplary embodiment.

The image processing apparatus 1 includes a control unit 10, an operation unit 12, an image processing unit 13, a scanner 140, and a printer 141.

The control unit 10 controls operation of the units in the image processing apparatus 1. The control unit 10 includes a CPU 100, a communication unit 101, a random access memory (RAM) 102, a hard disk drive (HDD) 103, a read-only memory (ROM) 104, a timer 105, a FAX unit 106, a scanner interface 108, and a printer interface 109.

The CPU 100 controls the entire control unit 10. The RAM 102 functions as a work memory for the CPU 100. The HDD 103 stores therein application programs and image data. The HDD 103 may be a storage medium, such as an optical medium or a flash memory. The ROM 104 stores therein a program read out by the CPU 100, such as a boot program. The HDD 103 may be configured in the form of an external storage apparatus to be detachable from the image processing apparatus 1.

The timer 105 manages a clock, to which the CPU 100 refers to acquire time information.

The communication unit 101 is connected to a local area network (LAN) 11 and controls data transmission and reception that are performed via the LAN 11. The FAX unit 106 is connected to a telephone line 14 and controls data transmission and reception that are performed via the telephone line 14.

The operation unit 12 includes a display unit 120, having a touch panel sheet attached thereto, and an input unit 121, such as a hardware key. The operation unit 12 displays a screen and receives operations from a user, for example. In the present exemplary embodiments, a liquid crystal display is taken as an example of the display unit 120. However, a display based on a different technique may be employed. In the present exemplary embodiments, a touch panel is taken as an example of the input unit 121. However, the input unit 121 may be configured to receive operations from a user via another interface, such as a mouse, an audio input device, and a keyboard.

The image processing unit 13 is controlled by the control unit 10 and includes an image analysis unit 130, an image generation unit 131, and an image output unit. The image analysis unit 130 analyzes the structure of an image of a document and extracts necessary information from the analysis result. The image generation unit 131 reads a document using the scanner 140, thereby digitalizing an image of the document to generate image data. The generated image data is stored in the HDD 103. The image generation unit 131 is also capable of generating document image data in another format using information obtained in analysis performed by the image analysis unit 130.

The image processing apparatus 1 includes a copy function, a scanner function, and a print function. The copy function is a function for executing a copy job that includes reading a document using the scanner 140 and causing the printer 141 to print an image on a sheet based on image data about the document. The scanner function is a function for executing a send job that includes reading a document using the scanner 140 and sending, using the communication unit 101, image data thus generated.

The print function is a function for executing a print job that includes printing an image on a sheet based on print data received via the communication unit 101 from an external information processing apparatus, such as a personal computer (PC).

Figure 2:
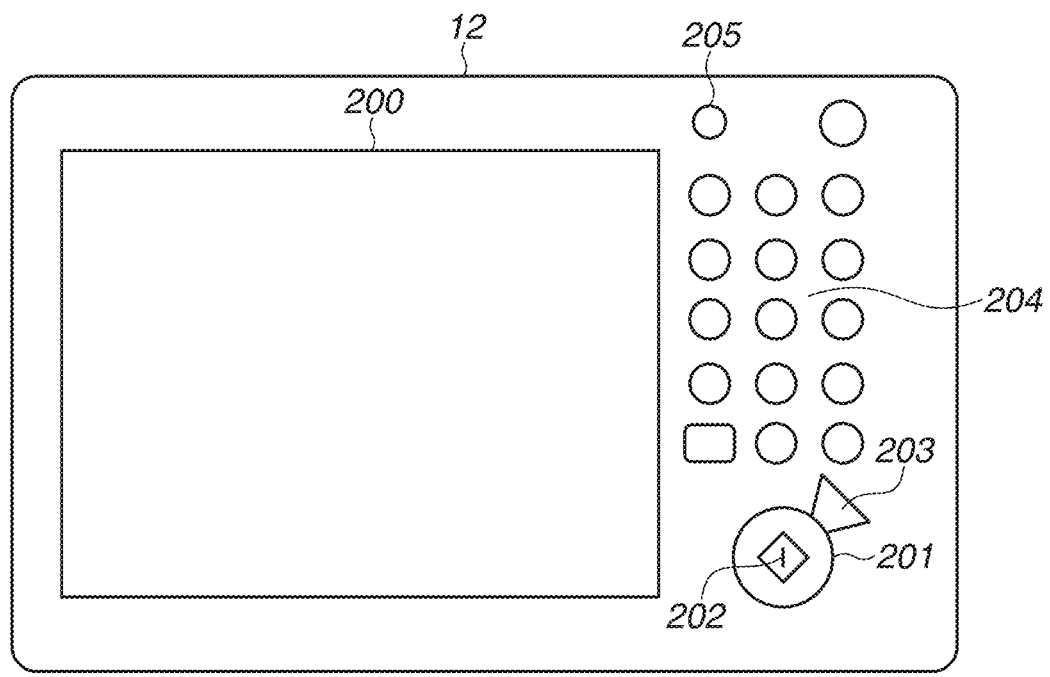
FIG. 2 is an external view of an operation unit according to an exemplary embodiments.

FIG. 2 is a schematic view of the operation unit 12 illustrated in FIG. 1.

The touch panel 200 in this example has a touch panel sheet attached on the liquid crystal display. The touch panel 200 displays an operation screen and software keys and, when a key displayed is selected, notifies the CPU 100 of positional information about the key. Thus, the touch panel 200 in the present exemplary embodiment functions as the display unit 120 in FIG. 1 and also as the input unit 121 at the same time.

Next, various keys and buttons, which are operated by a user, will be described. A start key 201 is used, for example, to instruct the scanner 140 to start operation for reading a document. A light emitting diode (LED) unit 202 for two colors, green and red, is placed at the center of the start key 201 and indicates, by color, whether the start key 201 is in a usable state. A stop key 203 is used to stop operation that is being executed. The numeric keypad 204 is configured in the form of keys having numbers and marks and is used to set the number of copies or to instruct the touch panel 200 to change screens. The user mode key 205 is used to call up a user mode. In the user mode, settings of image processing apparatus 1 are made.

Figure 3:
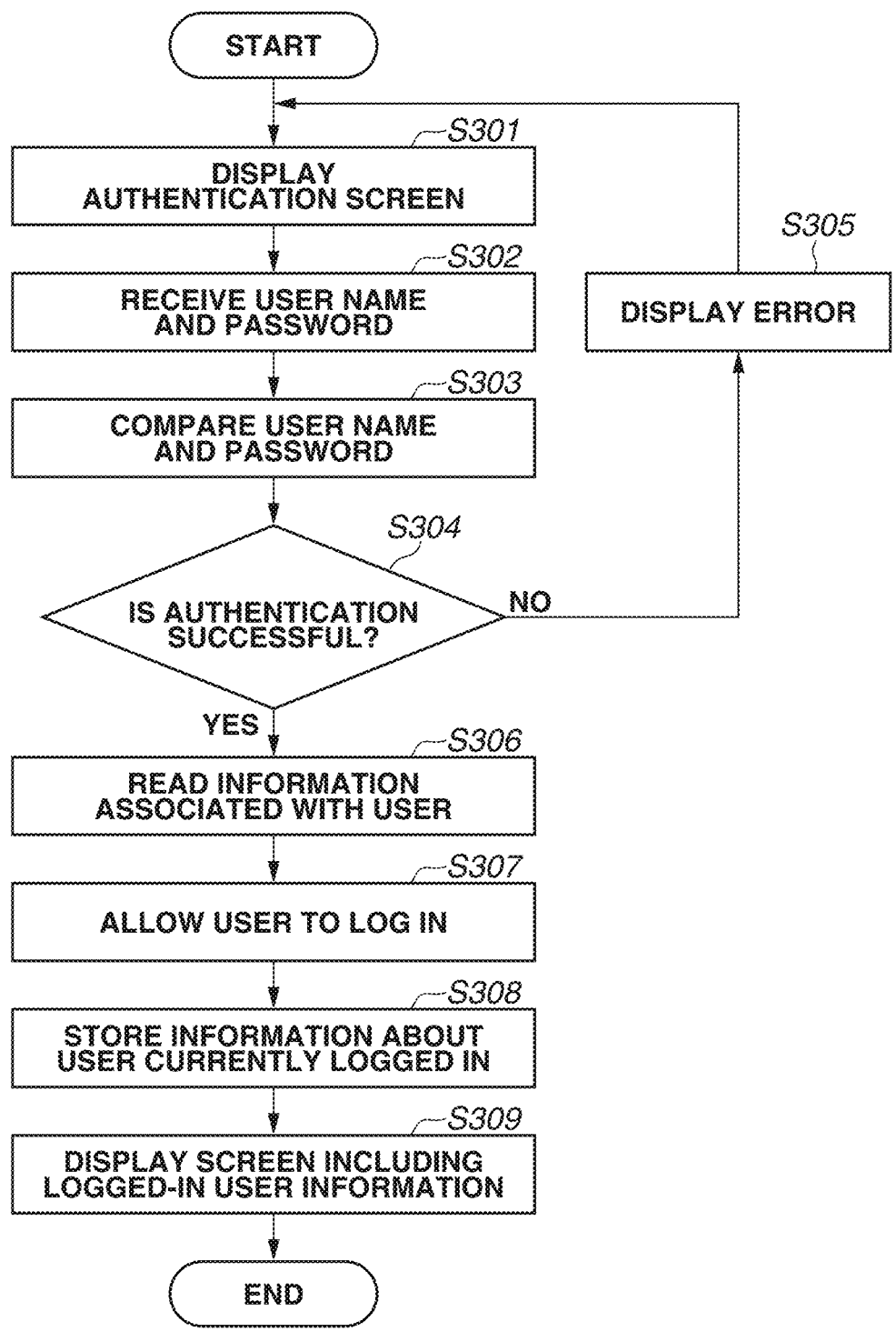
FIG. 3 is a flowchart of processing from when the image processing apparatus is started up to when a screen for a logged-in user is displayed.

FIG. 3 is a flowchart illustrating user-login processing according to the present exemplary embodiment. The processing of the flowchart in FIG. 3 is implemented by the CPU 100 reading a program stored in the ROM 104 into the RAM 102 and executing the program. The processing of this flowchart is started in response to startup of the image processing apparatus 1. The processing is also started in response to logout of a user from the image processing apparatus 1.

Figure 4:
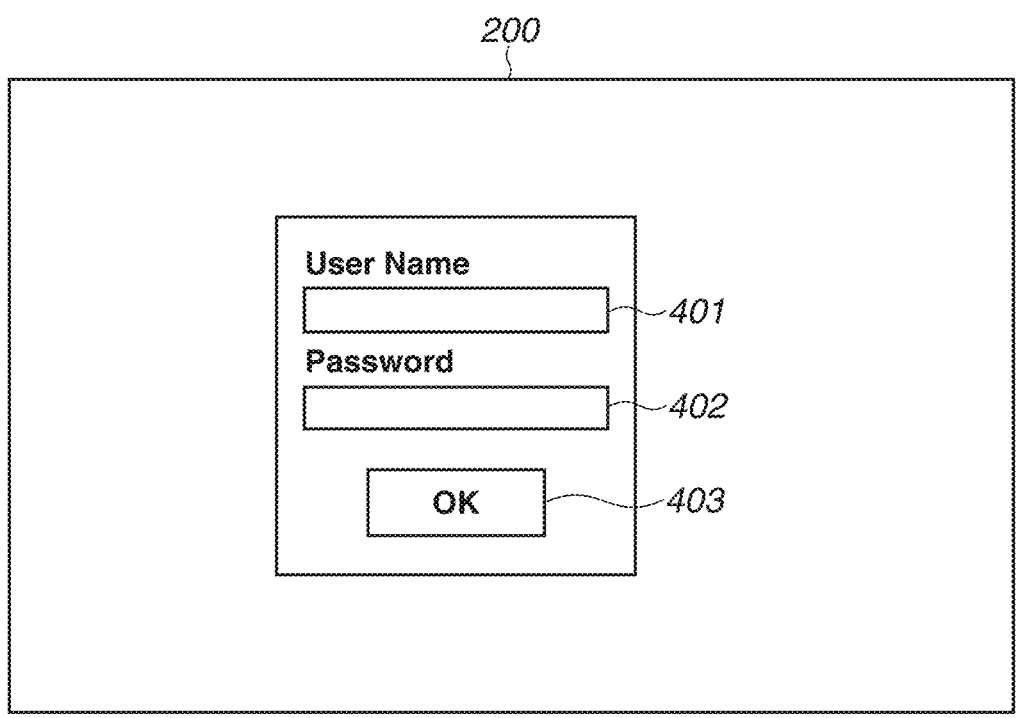
FIG. 4 is a schematic view of an authentication screen.

In step S301, the CPU 100 displays an authentication screen on the operation unit 12. The screen 200 in FIG. 4 is an example of the authentication screen. The screen 200 in FIG. 4 includes a username input field 401, a password input field 402, and an OK button 403.

In step S302, the CPU 100 receives a username and a password from the user via the operation unit 12. When the OK button 403 is pressed with the username input field 401 having a username input thereto and with the password input field 402 having a password input thereto, the CPU 100 stores the input username and password in the HDD 103, and the processing proceeds to step S303. In addition to or instead of configuring the CPU 100 to receive a username and a password that are input by a user, the CPU 100 may be configured to read out a username and a password from a card.

In step S303, the CPU 100 compares, for each user, the username and password received in step S302 with usernames and passwords previously registered in the HDD 103, thus determining whether the received username and password match any username and password that have been registered.

If the CPU 100 determines that the username and password match any of the registered ones, the CPU 100 determines in step S304 that authentication is successful (YES, in step S304), and the processing then proceeds to step S306. If the CPU 100 determines that the username and password do not match any of the registered ones, the CPU determines in step S304 that authentication is not successful (No, in step S304), and the processing proceeds to step S305.

In step S305, the CPU 100 displays an error screen on the operation unit 12, and the processing then proceeds to step S301. In step S306, the CPU 100 reads information associated with the user.

In step S307, the CPU 100 allows the user to log in to the image processing apparatus 1.

In step S308, the CPU 100 stores information about user currently logged in.

In step S309, the CPU 100 display a screen for the logged-in user on the operation unit 12.

Figure 5A:
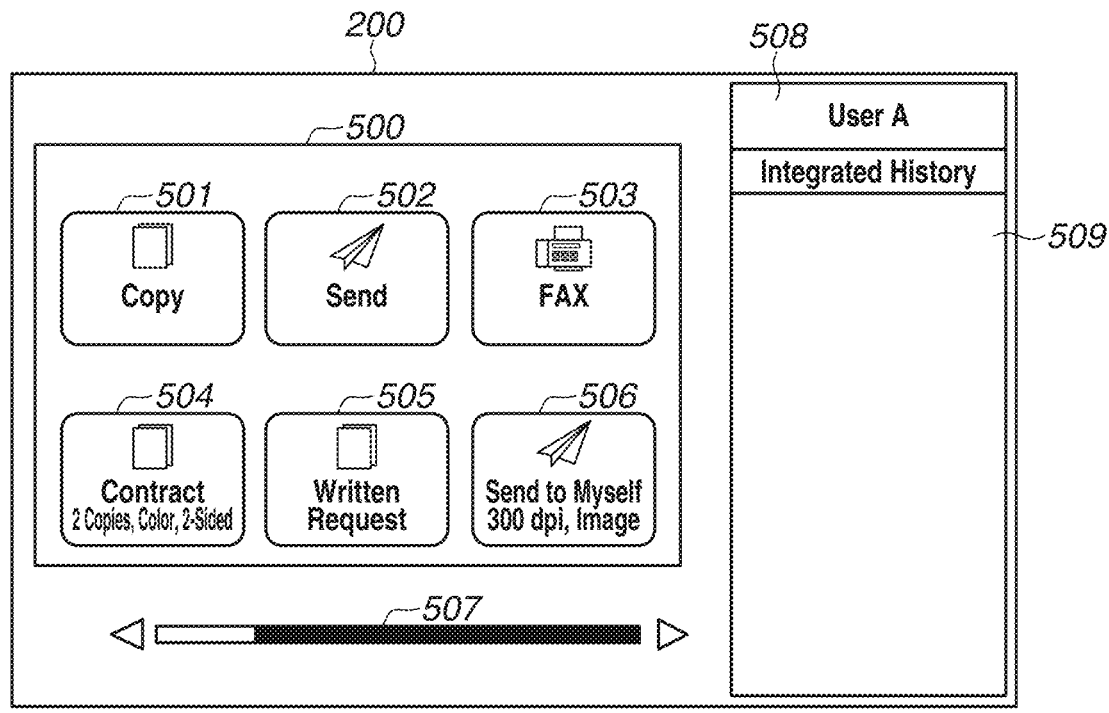
FIGS. 5A and 5B are schematic views of a home screen.
Figure 5B:
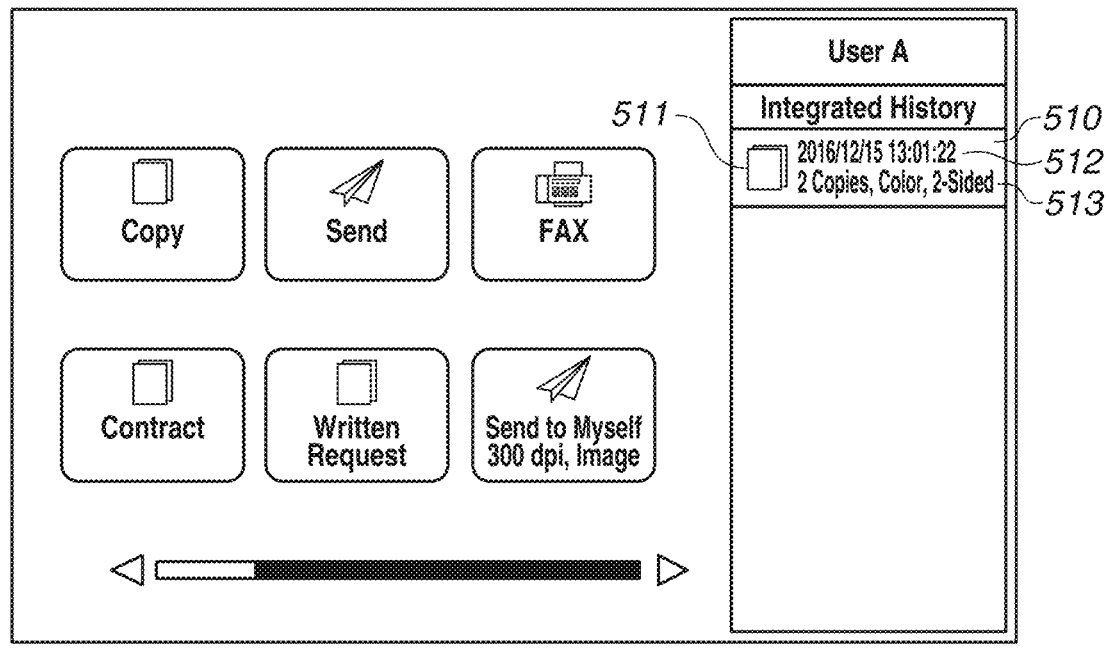

FIGS. 5A and 5B illustrate a home screen for displaying objects for selecting the copy function and for selecting the send function, which are displayed in response to login of a user to the image processing apparatus 1.

The home screen includes a menu 500 and an integrated history 509 for each user.

In the menu 500, function selection buttons (a "Copy" button 501, a "Send" button 502, and a "FAX" button 503)

for selecting a desired function are displayed, and so are custom buttons for a user to call up settings that have been previously set. Examples of the custom button include a "Contract" button 504, a "Written Request" button 505, and a "Send to Myself" button 506.

These buttons are displayed in a layout customized by the user based on information about the user who has logged in to the image processing apparatus 1. The buttons include "my buttons", which are displayed only on a home screen for an individual user, and shared buttons, which are displayed also on home screens for all users.

The slider bar 507 is used for displaying buttons that cannot be displayed all at once. The slider bar 507 indicates that this menu 500 can be slid to move. In response to the user sliding the slider bar 507, pressing an arrow, or flicking the menu 500, the CPU 100 calls up, from the HDD 103, an application button and a custom button that have been registered for the next area and displays these buttons.

In an upper right area 508, for displaying a username, a username of the user who is currently logged in to the image processing apparatus 1 is displayed. FIG. 5A illustrates a state in which "User A" is currently logged in to the image processing apparatus 1.

The integrated history 509 (detailed down below) is an area in which jobs are displayed as history records in chronological order of execution of the jobs, as a result of processing in which respective execution records of jobs executed by this image processing apparatus 1 for a plurality of applications are automatically registered in association with corresponding settings of the individual jobs. In the integrated history 509, a job positioned lower is one executed earlier in time, and a job positioned higher is one executed later in time. That is, in higher positions, the integrated history 509 displays the history records of jobs executed more recently. This configuration makes it easier for the user to check the history records of jobs that have been executed more recently without any operation performed on the slider bar 507.

When a user has been logged in to the image processing apparatus 1, a history of only jobs executed in the past by the user who has logged in is displayed in the area of this integrated history 509. In the case of the user who has never executed any job, or in the case of the user who has just deleted records on the integrated history 509, no records are displayed in the area for the integrated history 509 as illustrated in FIG. 5A.

Subsequent control on display of the integrated history 509 is executed by the CPU 100 based on an application for displaying an integrated history (hereinafter referred to as integrated history or integrated history application) stored in the HDD 103. Data to be used for the integrated history is stored in the HDD 103.

FIG. 9 is a flowchart of the processing to be performed when a job is executed, according to the present exemplary embodiment. The processing of the flowchart in FIG. 9 is implemented by the CPU 100 reading a computer program stored in the ROM 104 into the RAM 102 and executing the read program. This processing of the flowchart is started in response to selection of the Copy button 501 on the image processing apparatus 1.

Figure 10A:
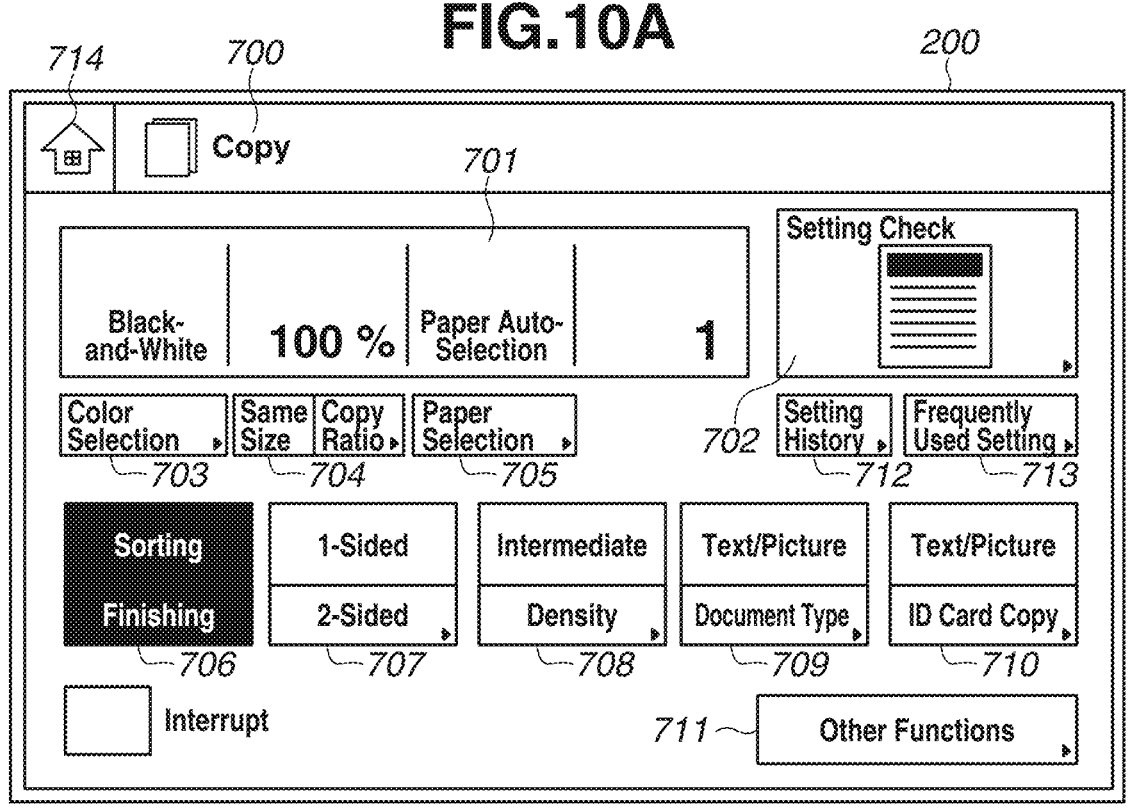
FIGS. 10A and 10B are schematic views of a copy screen.

In step S601, the CPU 100 causes the operation unit 12 to display a copy screen. The user makes settings for the number of copies, black-and-white or color, one-sided or two-sided reading, a copy ratio, and printing paper via the copy screen. The CPU 100 stores the received settings in the HDD 103. FIG. 10A illustrates a copy screen 200. The copy screen 200 includes a color selection button 703, a copy ratio setting button 704, a paper selection button 705, a finishing button 706, a two-sided button 707, a density button 708, a document-type button 709, and an ID card copy button 710. The copy screen 200 further includes an "other functions" button 711, a settings history button 712, and a frequently used setting button 713. The color selection button 703 is used for setting whether to read a document in color or black-and-white. The copy ratio setting button 704 is used for the copy ratio setting for reading a document and printing the image of the document in an enlarged or reduced size. The paper selection button 705 is used for selecting printing paper. The finishing button 706 is used for setting whether to make collated sets of copies from the first page in printing the document and then output without stapling, or to make collated sets of copies from the first page in printing the document and then staple each set of copies and output the sets of copies. The two-sided button 707 is used for setting whether to read only one side of a document or read two sides of the document. The density button 708 is used for setting the density of a printed image. The document-type button 709 is used for selecting whether the type of a document is text, text and picture, or picture. The ID card copy button 710 is used for setting an ID card copy mode in which images on both sides of a document are read and printed onto one side of a single piece of printing paper.

The "other functions" button 711 is used for making settings for functions (such as a punching function and a copy-forgery-inhibited pattern printing function) other than the above-described functions. The settings history button 712 is used for displaying the history of settings for copy jobs executed in the past. The frequently used setting button 713 is used for displaying a screen for registering beforehand, editing, and calling up settings that each user frequently uses. A home button 714 is used for returning to the home screen.

A setting confirmation button 702 is used for displaying, in a list and in the form of text strings, settings for a copy job currently being set.

An area 701 displaying setting values and respective displays on the buttons on the screen illustrated in FIG. 10A indicate a state in which black-and-white is set for the color selection, 100% is set for the copy ratio, automatic selection is set for the paper size, 1 is set as the number of copies, and collating is set.

The user thus makes copy settings and presses the start key 201 with the document placed on the scanner 140.

In step S602, the CPU 100 determines whether the start key 201 has been pressed.

In step S603, the CPU 100 reads, from the HDD 103, information about settings received via the copy screen illustrated in FIG. 10A and executes a copy job in accordance with the read settings.

In step S604, the CPU 100 stores information about settings of the executed copy job as a job execution history record in the HDD 103. At the same time, the CPU 100 stores temporal information acquired by referring to the timer 105 as a part of the job execution history record.

FIG. 12A represents an example of data saved in a memory area in the HDD 103 for the copy function in step S604. As illustrated in a header 801 of a data table in FIG. 12A, this table has setting values of the application recorded therein. A default setting row 802, which is the first row, has default setting values for the copy function saved therein. A row for a most-recent settings row 803, which is the second row, has setting values additionally saved for a job that has been executed for this time.

Figure 13:
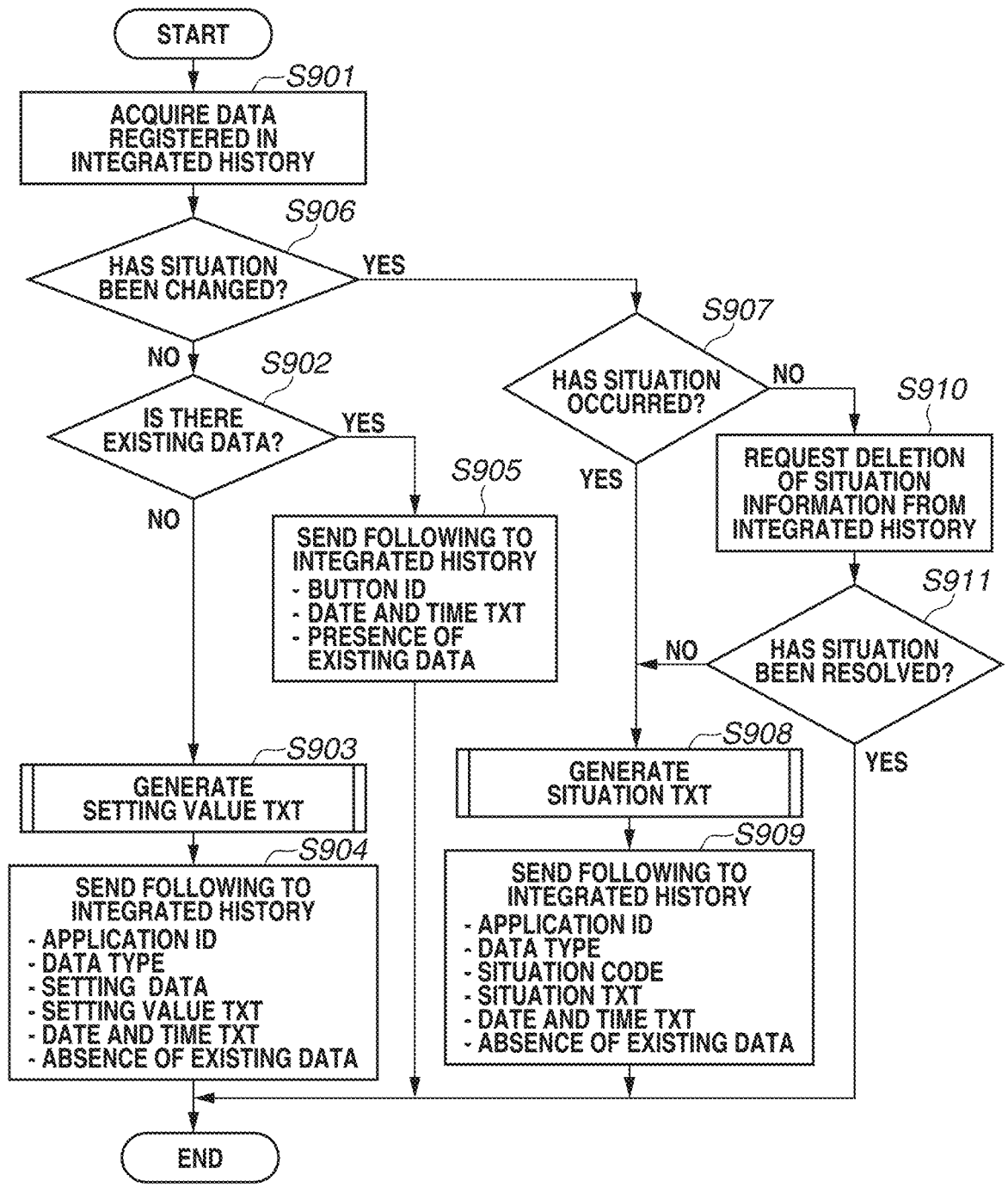
FIG. 13 is a flowchart of processing for generating respective names of a setting button and a situation information button to be displayed in an integrated history.

FIG. 13 illustrates processing of generating the names of buttons to be displayed in integrated history 509 on the application side. The processing of the flowchart in FIG. 13 is implemented by the CPU 100 reading a program stored in the ROM 104 into the RAM 102 and executing the read program. This flowchart is executed in response to the completion of execution of the job in step S604 in FIG. 9.

After the process in step S604 in FIG. 9 is completed, in step S901, the CPU 100 acquires data about the integrated history 509 stored in the HDD 103. FIG. 14A illustrates a data table saved for the integrated history 509. As illustrated in a header 1001 of the data table, button IDs, application IDs, data types are stored. Data about setting values set on the application or text data are stored. In addition, the data table stores setting data set by the application, information about an apparatus detected by the application, situation categories, dates and time, setting values of individual jobs, and/or text data indicating situations surrounding the job occurrence.

The button ID is used for uniquely identifying each history record registered in the integrated history 509. The application ID is used for identifying which application has executed a job corresponding to a history record registered in the integrated history 509. The application ID is previously determined for individual applications in such a manner that a management application of the image processing apparatus 1 itself is assigned "100", a copy application is assigned "101", and a sending application is assigned "201".

The data type is used for identifying the category of a data main body (described down below). The data type "setting" represents job setting data, and the data type "situation" represents situation information data about the image processing apparatus 1 itself or each job.

The "data" in the table indicates data about settings of a job executed by the corresponding application. For example, the application for copy includes all functions and setting values, such as the number of copies, color selection, and the paper size, the settings of which are made on the application.

The "text to display" in the table includes date and time and setting values. The setting value is a setting used in each job and/or information necessary for the application to manage the state of the image processing apparatus 1. The situation category of the image processing apparatus 1 itself and the situation category of each job are included in the state of the image processing apparatus 1. The situation category of the image processing apparatus 1 itself is, for example, information about the image processing apparatus 1 in which a failure has occurred to a facsimile line as illustrated in a row 1006 in FIG. 15A. The situation category of each job is, for example, a situation category regarding a specific job which, for example, includes an error having occurred in sending an electronic mail as illustrated in a row 1007 in FIG. 15B.

Such various data are stored in formats that can be read by applications that registers the corresponding data. Date and time in the "text to display" is date and time when the corresponding job has been executed or when the corresponding application detects a situation of the image processing apparatus 1 itself or each job, and is text data to be displayed on a button under the integrated history 509. The setting value in the "text to display" indicates either text data obtained by picking up a characteristic setting among settings for each executed job or a characteristic message that represents a situation of the image processing apparatus 1 itself or the corresponding job. This setting value is also displayed on the button of the integrated history 509. These text strings of the date and time and the setting value enable the user to browse the integrated history 509 to recall, about the individual history records, specific settings with which each job has been executed.

After acquiring data about the integrated history 509 in step S901, the CPU 100 determines in step S906 whether the situation in the image processing apparatus 1 has changed.

If the CPU 100 determines that the situation has not changed (NO, in step S906), the processing proceeds to step S902. In step S902, the CPU 100 then compares the acquired data with setting data about a job executed for this time, thus checking whether any history record of the same setting data has been stored in the integrated history 509. The data about the integrated history 509 is compared with the setting data about the job executed for this time for the purpose of avoiding duplication of records in the history. It is considered possible that, as a result of a duplication, the display area of the integrated history 509, which is limited, may be filled up with data having the same settings. A wider range of choices is made available to a user who reuses the history with a list of jobs having a wider variety of settings compared with a list of jobs having the same settings. In the current processing, there is no data to compare, and the CPU 100 determines that the setting data about the job executed for this time is not included in the existing history data. If the integrated history 509 does not include data about the same history record (No, in step S902), the processing proceeds to step S903. In step S903, the CPU 100 starts process of generating text which is to be displayed in the integrated history 509 and corresponds to setting values.

Figure 16:
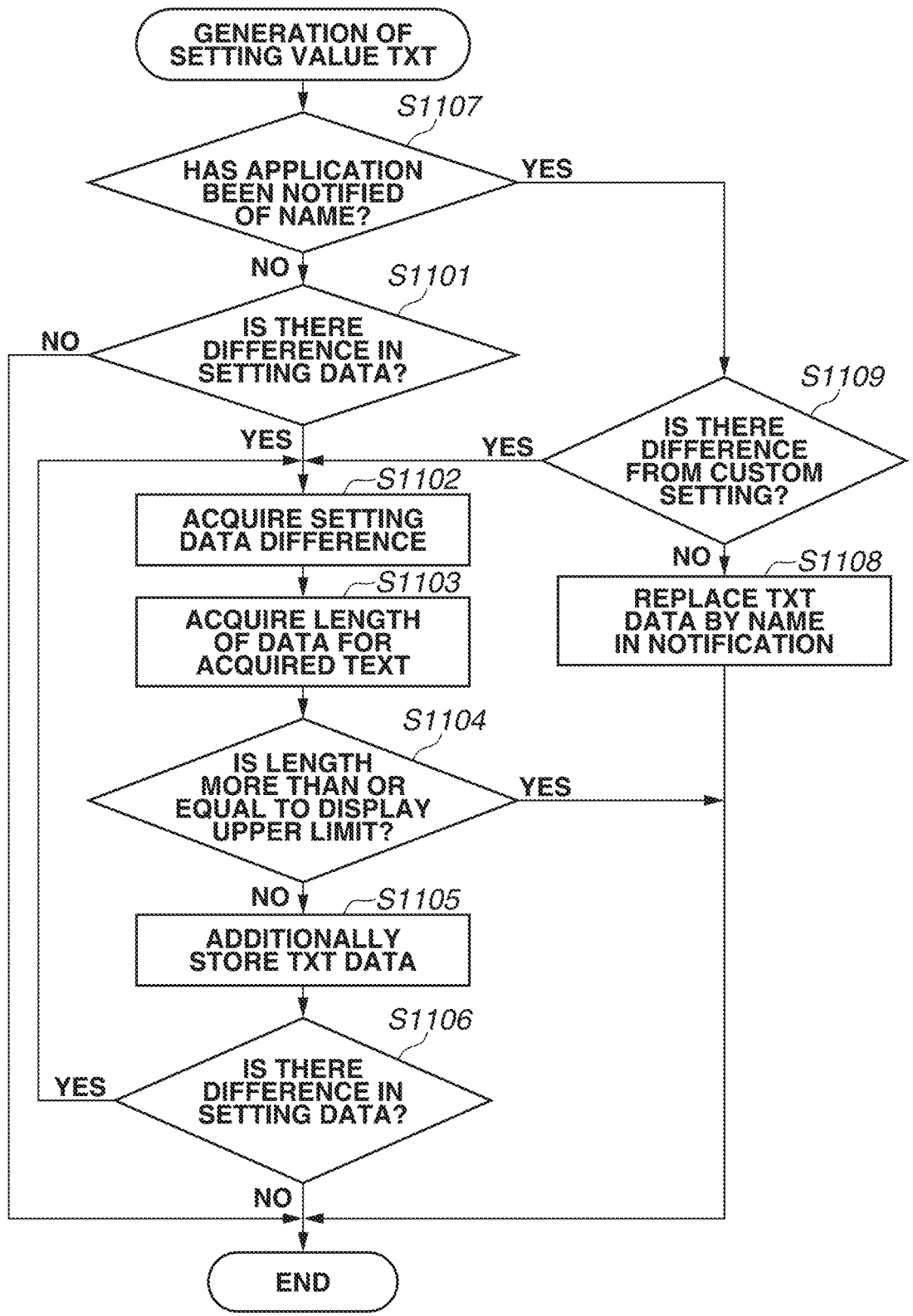
FIG. 16 is a flowchart of processing for generating text for setting values.

FIG. 16 is a flowchart illustrating processing of generating text for setting values. The processing of the flowchart in FIG. 16 is implemented by the CPU 100 reading a computer program stored in the ROM 104 into the RAM 102 and executing the read program.

At the start, in step S1107, the CPU 100 determines whether the application has been notified from the menu 500 of a name 1802, a name of a custom button. The name is one piece of information among pieces of information that the application is notified of when a job is executed in response to selection of any one of the custom buttons (504 to 506), which will be described in description of the operation of each custom button. If the CPU 100 has determined that the application has been notified of the name 1802 (YES, in step S1107), the processing proceeds to step S1109. In step S1109, the CPU 100 compares the setting values of the job executed this time with custom setting values. If the CPU 100 determines that there is no difference in setting data (NO in step S1109), the processing proceeds to step S1108. In step S1108, the CPU 100 replaces TXT data in step S1108 with the name 1802 of which the application has been notified, and the processing ends. If the CPU 100 determines in step 1107 that the application has not been notified of the name (No, in step S1107), the processing proceeds to step S1101. If the CPU 100 determines in step S1109 that settings for the job have been changed from the custom settings with the application having been notified of the name 1802 (YES, in step S1109), the processing proceeds to step S1102.

If the processing proceeds from step S1107 to step S1101, the CPU 100 compares setting values of the job executed for this time with setting values of the default settings. Specifically, the CPU 100 performs the comparison of the setting values in FIG. 12A sequentially from the left item to the right item. In this example, the CPU 100 compares the setting value for the number of copies in the first place. If there is more than or equal to one difference as a result of the comparison (YES, in step S1101), the processing proceeds to step S1102. In step S1102, the CPU 100 acquires text corresponding to the setting values including the difference. The reason for picking up a difference between the settings for the corresponding job and the default settings is that an item for which the user has deliberately changed the setting value is considered to have been more memorable. In this example, there is a difference in the number of copies in the first place, and the text that is first acquired by the CPU 100 is "2 Copies". Subsequently, in step S1103, the CPU 100 acquires the length of the text. Each button displayed in the integrated history 509 is limited in the length of the text. Thus, in step S1104, the CPU 100 checks whether the length of the text exceeds the upper limit of the displayable range. If the CPU 100 then determines that the length exceeds the upper limit of the displayable range (YES in step S1104), corresponding text data is not added, and the processing of generating text to display ends. If the CPU 100 determines that the upper limit is not exceeded (NO, in step S1104), the processing proceeds to step S1105. In step S1105, the text data that has been acquired (loaded) is added as text data to be displayed in the integrated history 509 by the CPU 100 for the setting value. If there is a difference for any of the remaining setting values (YES, in step S1106), the processing proceeds to step S1102 and the CPU 100 repeats the processing in steps S1102 to S1105. If all pieces of the setting data having differences have been processed before the upper limit of the displayable range is exceeded, the processing of generating text data ends as well. In this example, two-sided setting is the last item for which the setting value has a difference. Thus, all that is generated as text data is "2 Copies, Color, 2-Sided". The setting values for the rest of the items have no differences, and thus, data for setting value text is completed by including the data for two-sided setting. Finally, the application ID of the application that is executed by the CPU 100 and the setting data of this job that have been saved in the HDD 103 in step S604 in FIG. 9 are saved as data1.xml. Along with this process, the CPU 100 saves in the HDD 103 the generated setting value text, text for job execution date and time, and information about the presence of existing data, and sends those pieces of information to the integrated history 509 in step S904. Information about the presence of the existing data results from the comparison in step S902.

In the above-described manner, an object to be displayed in the integrated history 509 is registered.

Next, the case where the processing proceeds to step S907 with the determination of YES in step S906 will be described. For example, if a failure occurring in the facsimile line is detected, the processing proceeds from step S906 to step S907. The image processing apparatus 1 includes a "state monitoring application" for monitoring the state of the image processing apparatus 1 itself. The state monitoring application is stored in the HDD 103 and is read into the RAM 102 and executed by the CPU 100.

In step S901, the CPU 100 acquires data saved in the HDD 103 for integrated history 509. A data table saved for the integrated history 509 is in a state illustrated in FIG. 14E.

If the CPU 100 has determined in step S906 that the situation of the image processing apparatus 1 has changed (YES, in step S906), the processing proceeds to step S907. In step S907, the CPU 100 determines whether a new situation has occurred. If the CPU 100 determines that a line disconnection has occurred as a new situation (YES, in step S907), the processing proceeds to step S908. In step S908, the CPU 100 acquires a state category and explanatory text to be displayed, from a detected situation category in accordance with a situation explanation table illustrated in FIG. 19A. The CPU 100 acquires the state category="warning" (1404) and an explanation ID="MSG_ID_FAX_LINEOFF" (1405) that correspond to the situation category="line" (1402) and the state="disconnection" (1403). The state category="warning" indicates a state in which the use of the image processing apparatus 1 or any application that is affected by the state is to be stopped.

Figure 8A:
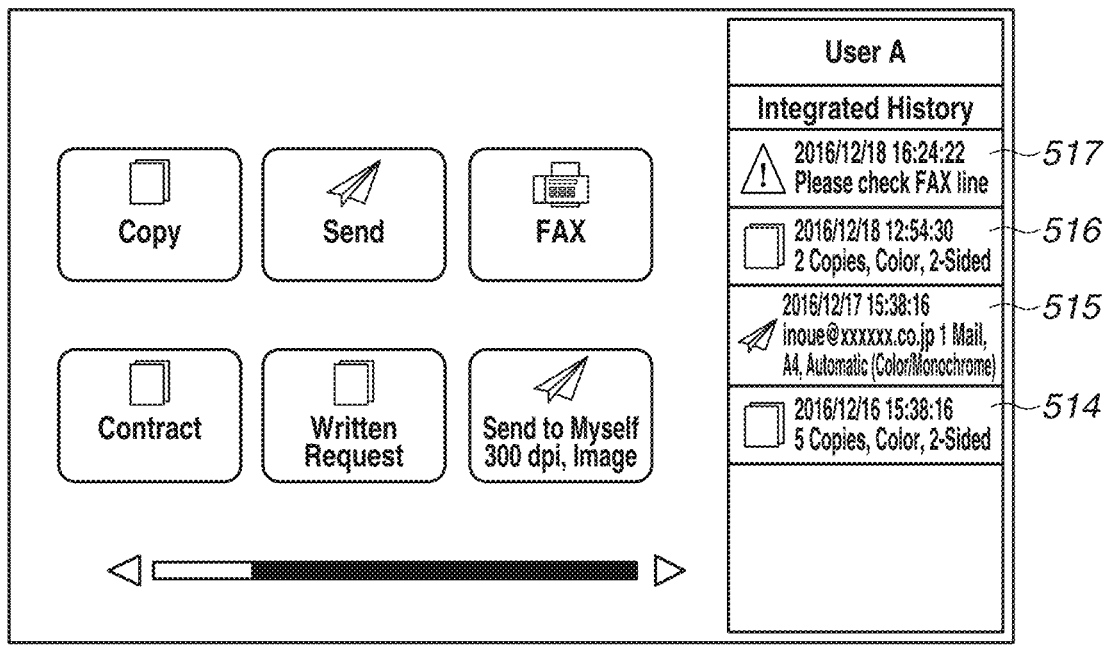
FIGS. 8A, 8B, and 8C are schematic views of the home screen.

Subsequently, the CPU 100 executes the state monitoring application, thus referring to a correspondence table of explanation IDs and display language text strings illustrated in FIG. 20. Then in step S908, the CPU 100 acquires situation text (TXT)="Please check FAX line" (1503) with the language thereof corresponding to the display language set in the operation unit 12 based on the acquired explanation ID="MSG_ID_FAX_LINEOFF". Finally, in step S909, the CPU 100 sends the acquired state category="warning" (1404) and a display text string="Please check FAX line" (1503) as situation TXT to the integrated history 509. Here, the CPU 100 sends these pieces of information, the situation category, and the state, together with the application ID, the data type, the situation TXT, date and time TXT, and information indicating the absence of existing data, to the integrated history 509 with the situation category and the state being grouped as situation information data="FAXLINE_ERROR.xml". Thus, the state of the data table saved for the integrated history 509 changes to the one as illustrated in FIG. 15A and a screen for the integrated history 509 becomes the screen as illustrated in FIG. 8A. In FIG. 8A, an error record 517 is displayed in priority to other history records 514 to 516 and in a position higher than positions at which the history records 514 to 516 are displayed. The error record 517 includes an alarming icon in the left part thereof.

If it is detected here that the facsimile line has recovered from the disconnection, the CPU 100 generates "line" as a situation category and "normal" as a state. The situation category="line" is already in the integrated history 509. The state monitoring application thus determines that this situation is not a situation that has newly occurred (NO in step S907), and the processing proceeds to step S910. In step S910, the CPU 100 requests the integrated history 509 to delete that information, and the processing proceeds to step S911. In step S911, the CPU 100 determines whether the situation has been resolved. If the CPU 100 determines in step S911 that a situation other than the state category="normal" has not been resolved (No, in step S911), the processing proceeds to step S908. In step S908, the CPU 100 performs the same processing as the processing which is to be performed when a new situation has occurred. Thus, situation information about a new state is displayed in the integrated history 509. The state category that corresponds to the situation category="line" and the state="normal" for this time is "normal". Thus, the CPU 100 determines in step S911 that the situation has been resolved (YES in step S911), and the processing ends without any further processing being performed. Thus, the situation that has been displayed in the integrated history 509 disappears.

While the above description has been provided using a case in which the CPU 100 has detected a situation of line disconnection, a similar operation is performed also when an application to which a job is input has detected a state that the user needs to be notified of.

For example, suppose that the copy application has been instructed to execute a job with a stapling setting while the maximum number of sheets that can be stapled is exceeded in the apparatus. The operation when the user executes a copy job has been described above, and thus description will be provided here only of operation that is performed when a situation of some sort that the user needs to be notified of has occurred.

Figure 8B:
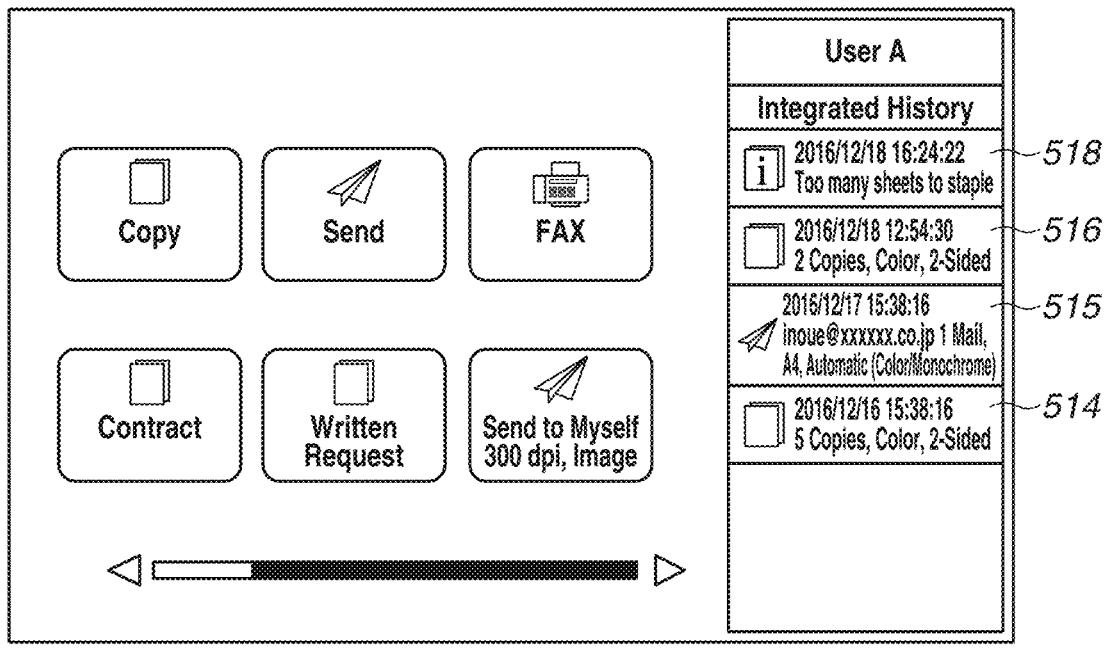

First, the copy application reads, with set conditions, a document placed by the user and calculates the total number of pieces of paper that need to be output. This example assumes that the copy application has determined that the total number of output pieces exceeded the maximum number of sheets that can be stapled. Based on this situation, the copy application generates a situation category="execution", a state="Too many sheets to staple", and a state category="alert". The state category="alert" is a state category for which the execution of the job is not stopped but the user needs to be alerted. Thus, it is determined in step S906 that the situation of the copy application that is to be executed by the CPU 100 has changed. The copy application then determines in step S907 whether a new situation has occurred. If the state monitoring application determines that the situation category="execution" is a situation that has newly occurred, the copy application acquires a state category and explanatory text to be displayed, from the situation category detected by the copy application in accordance with a situation explanation table illustrated in FIG. 19B. The copy application acquires an explanation ID="MSG_ID_COPY_STAPLEOVER" (1407) that corresponds to the situation category="execution" (1409) and the state="Too many sheets to staple" (1406). Subsequently, based on the correspondence table of explanation IDs and display language text strings illustrated in FIG. 20, the copy application acquires situation TXT="Too many sheets to staple" (1505) in the display language of the operation unit 12 based on the acquired explanation ID="MSG_ID_COPY_STAPLEOVER" (1504) (step S908). Finally, in step S909, the CPU 100 sends the acquired state category="alert" (1407) and a display text string="Too many sheets to staple" (1505) as situation TXT to the integrated history 509. Here, the CPU 100 sends these pieces of information, the situation category, and the state, together with the application ID, a data type, the situation TXT, and date and time TXT, and information indicating the absence of existing data, to the integrated history 509 with the situation category and the state being grouped as situation information data="STAPLEOVER.xml" (step S909). Thus, the state of the data table saved for the integrated history 509 changes to the state as illustrated in FIG. 15B and a screen for the integrated history 509 becomes the screen as illustrated in FIG. 8B. In FIG. 8B, an error record 518 is displayed in priority to the other history records 514 to 516 and in a position higher than positions at which the history records 514 to 516 are displayed. The error record 518 includes, in the left part thereof, an icon that indicates an error.

Figure 17:
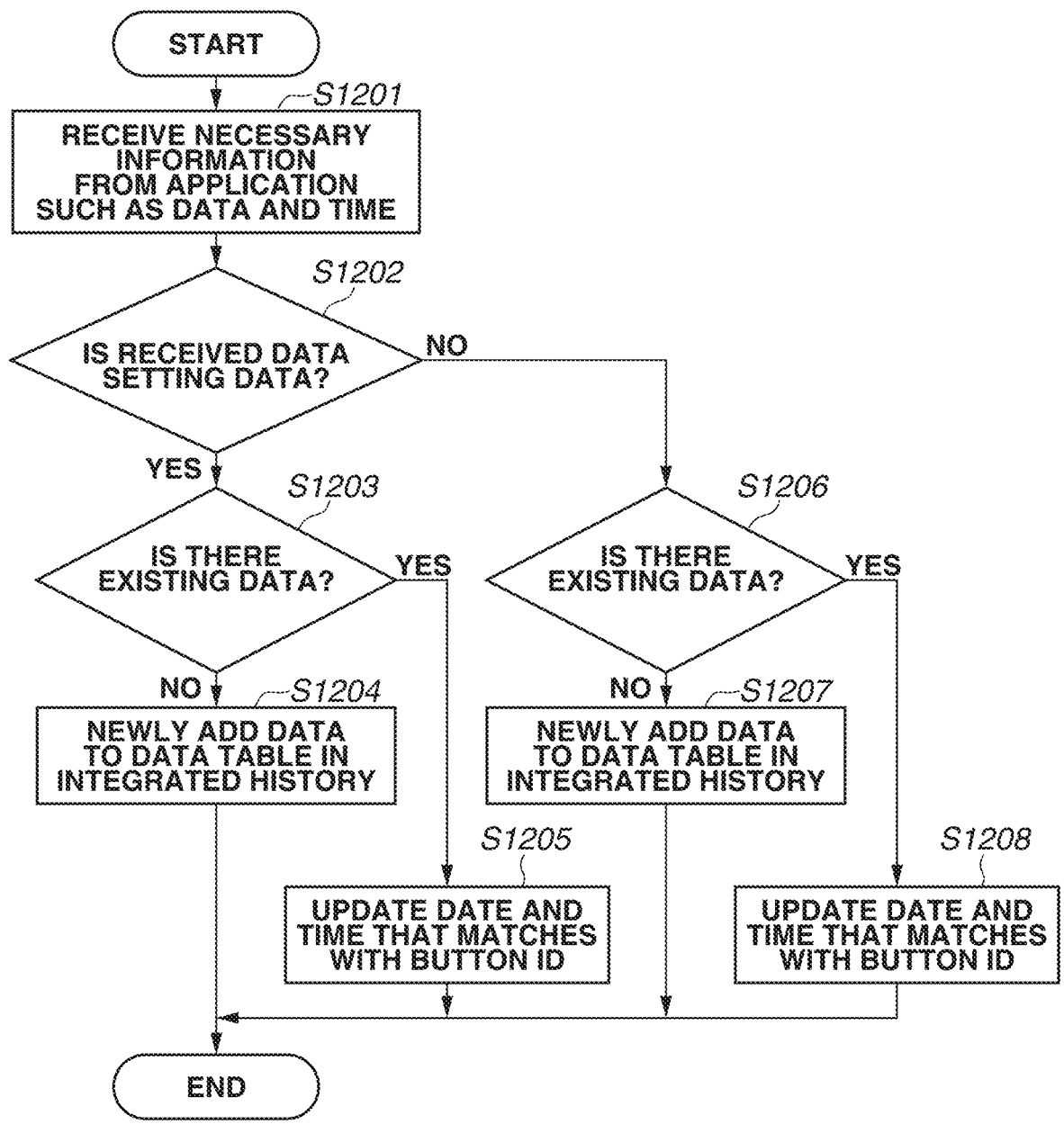
FIG. 17 is a flowchart of processing until a history is displayed in the integrated history.

FIG. 17 is a flowchart of processing up to the point where the integrated history 509 that has received the above setting information data or situation information data displays a history.

In step S1201, the integrated history 509 that is executed by the CPU 100 receives the values saved in the HDD 103 in step S604 in FIG. 9 from the application that is executed by the CPU 100. Subsequently, in step S1202, the CPU 100 determines whether the received data are setting data. If the CPU determines that the received data is setting data, the processing proceeds to step S1203. In step S1203, the CPU 100 checks whether there is existing data. If the CPU 100 determines that there is no existing data (NO, in step S1203), the processing proceeds to step S1204. In step S1204, the CPU 100 newly adds the data received from the application in the data table of the integrated history 509. The data received from the application are added in the data table as illustrated in FIG. 14B. If the CPU 100 determines that there is existing data (YES, in step S1203), the processing proceeds to step S1205. In step S1205, the CPU 100 performs nothing other than updating the date and time.

If the CPU 100 determines that the received data are not setting data (NO, in step S1202), the processing proceeds to step S1206. In step S1206, the CPU 100 checks whether there is existing data. If the CPU 100 determines that there is no existing data (NO, in step S1206), the processing proceeds to step S1207. In step S1207, the CPU 100 newly adds the data received from the application in the data table for the integrated history 509. The data received from the application are added in the data table as illustrated for a button ID 1003 in FIG. 14E. If there is existing data, the CPU 100 performs nothing other than updating the date and time in step S1208.

The screen of the operation unit 12 is still a copy screen, and the CPU 100 displays the home screen in FIG. 5B in response to selection of the home button 714. As illustrated in FIG. 5B, the home screen for the user A is displayed with a button 510 for a history record for this time displayed in the integrated history 509. In the history button (also referred to as button or history record) 510 for this time, an icon 511 for the application identified from the application ID, job execution date and time 512, and text 513 that represents differences from the default settings are displayed. The icon 511 for the application is an icon for a copy job. An icon for a send job is displayed as an icon in a history record 515 in FIG. 6B. This information is important to help the user to, when browsing the history record 510, recall specific settings with which the corresponding job has been executed. When the user wishes to execute a new job with the same settings, the CPU 100 performs, in response to the user having pressed the history record 510, processing for calling up the application with the same settings reflected in the job.

Figure 18:
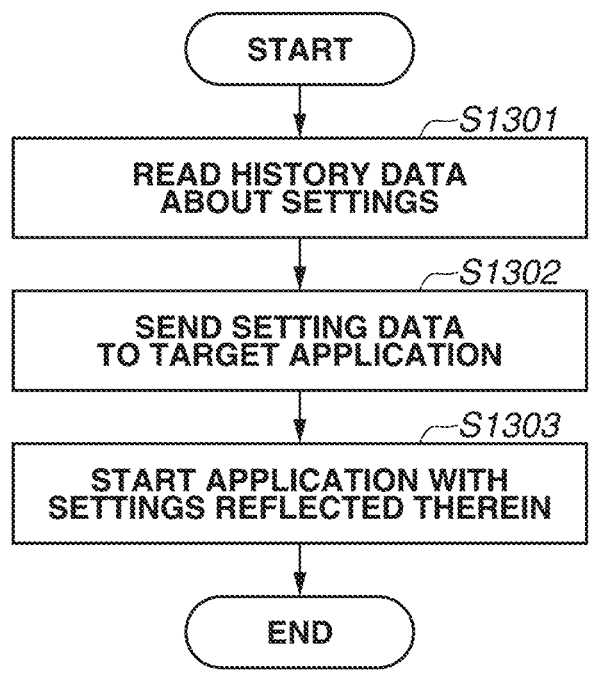
FIG. 18 is a flowchart of processing for calling up an application from the integrated history.

The processing of calling up an application from the integrated history 509 will be described with reference to FIG. 18. The processing of flowchart in FIG. 18 is implemented by the CPU 100 reading a computer program stored in the ROM 104 into the RAM 102 and executing the read program.

Figure 10B:
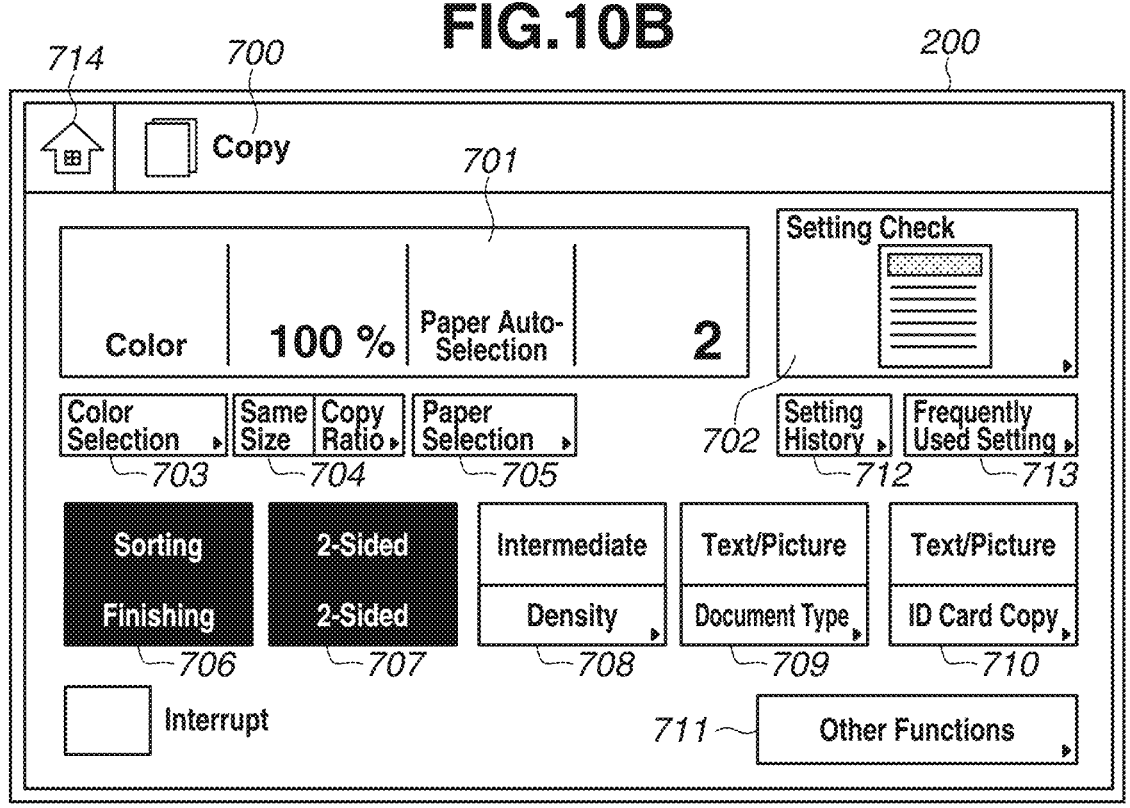

In response to the user selecting the history record 510 (also referred to as history record or object) in the integrated history 509 in FIG. 5B, the CPU 100 reads in step 1301, from the data table saved in the HDD 103 for the integrated history 509, data for a history that corresponds to the selected button ID. The integrated history 509 determines a target application from an application ID in history data that is read out, and sends setting data to the target application in step S1302. Copy is to be performed in this example, and thus, the copy application is called up by the CPU 100. In step S1303, the copy application that runs on the CPU 100 reads setting values for various settings from the received data, and displays a screen for the application on the operation unit 12 with the settings reflected therein. FIG. 10B illustrates a copy screen displayed with settings in the history record 510 reflected therein.

By thus using the integrated history 509, the user can call the settings with which the user has executed a job with a single touch and use the settings.

Next, a description will be provided of a case of executing a job with a change in some of the settings called up from the integrated history 509.

Figure 6A:
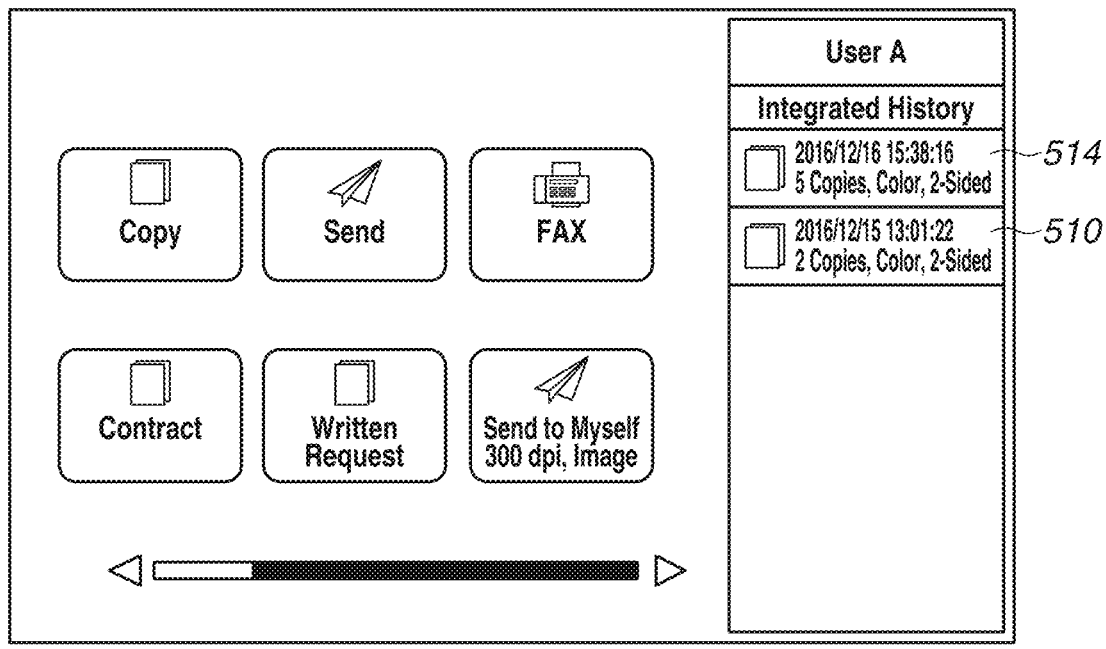
FIGS. 6A and 6B are schematic views of the home screen.
Figure 6B:
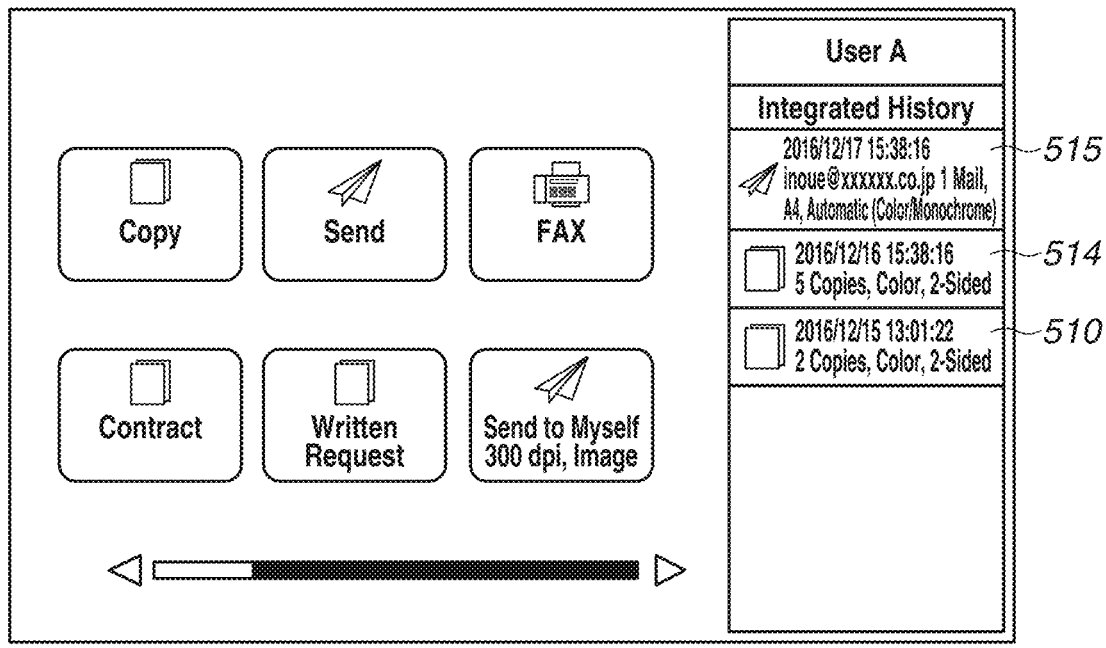

In this example, suppose that the user has changed only the number of copies to five among the above settings of the current job in step S602 and pressed the start key 201. In step S603, the application that runs on the CPU 100 executes a job in accordance with specific settings. In step S604, the CPU 100 overwrites the settings of a job at the time of executing the job with settings as illustrated in a row 804, which is the second row, in FIG. 12B and saves the overwritten settings. Thereafter, in a manner similar to that described above, the current setting data are compared with existing data in the integrated history 509, as in the processing of the flowchart in FIG. 13. The current settings are not assumed to be included in the existing data in this example, text corresponding to a difference in settings is generated in accordance with the flowchart in FIG. 16, and various data are sent to the integrated history 509. Thereafter, a history record with new settings is added in accordance with the flowchart in FIG. 17. FIG. 14C represents a history having a row 1003 newly added to the data table. FIG. 6A is a screen on which the history 514 is newly displayed in the integrated history 509 on the home screen. In the integrated history 509, jobs are sorted in descending order of execution date and time thereof and displayed while being arranged side by side, and thus, a newly added job history record is added in the topmost position as illustrated in FIG. 6A.

Thus using the job settings once used by the user can save the user from having to make job settings.

When the user selects the history record 510, in FIG. 6A, of a copy job first executed and executes a job without changing any settings, the CPU 100 makes a determination of YES for the determination as to whether there is existing data in the integrated history 509 in step S902 in FIG. 13. Thus, the processing in step S903 for generating text is not executed. In step S905, data about date and time text, information indicating the presence of existing ID, and information about which button ID in the integrated history 509 corresponds thereto are sent to the integrated history 509 from the application. Since there is an existing ID, in the process of step S1202, which is to determine whether there is existing ID for processing of perform saving into data for the integrated history 509 in FIG. 17, it is determined that there is the existing ID. In step S1204, the CPU 100 updates only a date in data, in FIG. 14D, the button ID of which is matched.

FIG. 14E represents data 1005 with a date updated. The integrated history 509 displays history records in descending order of date and time thereof, and thus the copy history record 516 that has been the most recently executed is in the topmost position in the setting history as in FIG. 7A.

Figure 7A:
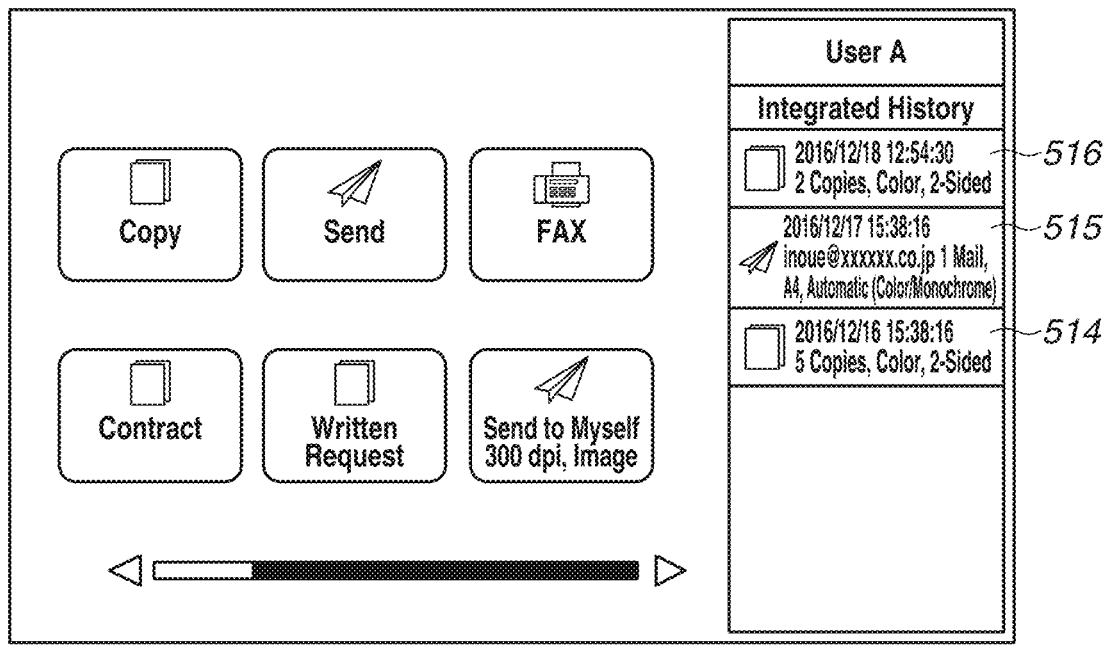
FIGS. 7A and 7B are schematic views of the home screen.

Next, a description will be provided of a case of returning to the home screen without execution of a job after calling up settings of the corresponding job in response to selection of the send history record 515 in FIG. 7A. In such a case, the processing in step S604, in which settings are saved, and the subsequent steps in FIG. 9 is not performed because a job is not executed. Accordingly, processing for updating history data is not performed, and display is unchanged from the one in FIG. 7A.

Next, processing of calling up an application from the integrated history 509 will be described with reference to FIG. 18.

Suppose that the current screen is FIG. 8A and data for the integrated history 509 is the data as illustrated in FIG. 15A.

Figure 21:
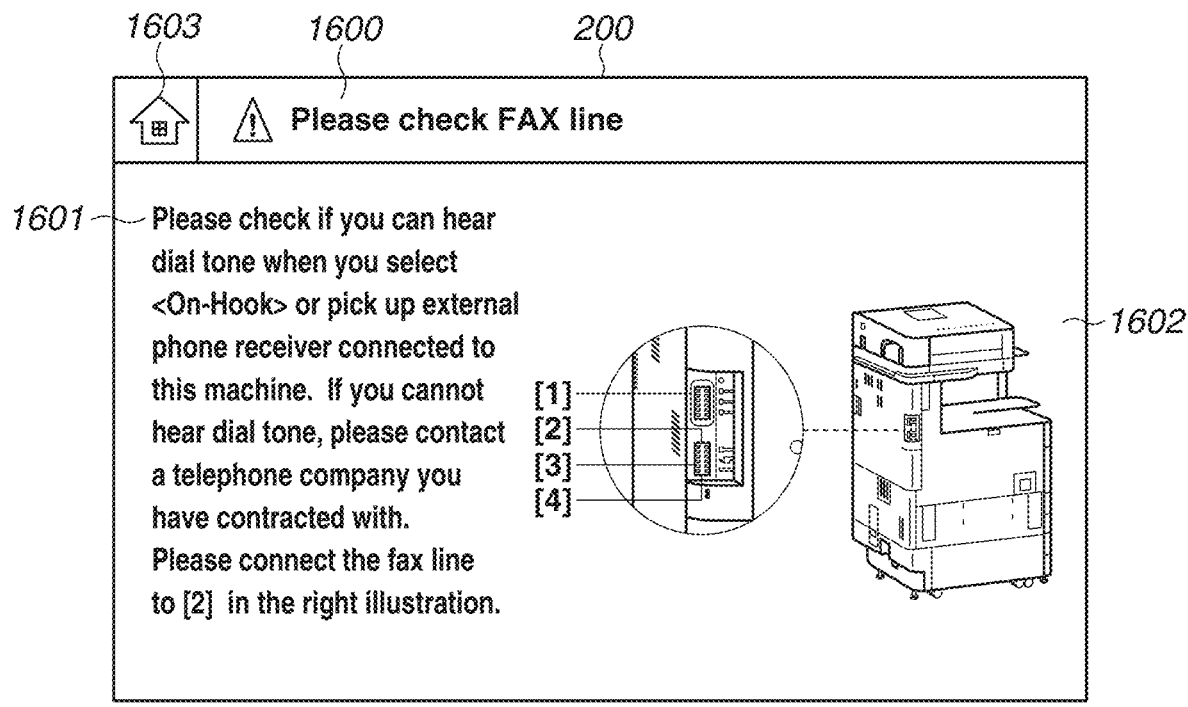
FIG. 21 is a schematic view of the error screen.

When the user presses the error record 517 in the integrated history 509, the integrated history 509 that runs on the CPU 100 reads out, from the data table in FIG. 15A for the integrated history 509 that is saved in the HDD 103, data about a history record of the button ID=1004 that has been pressed. The integrated history 509 determines, based on the application ID=100 in the read history record data, that a target application is the state monitoring application. In step S1302, the integrated history 509 sends the situation information data="FAXLINE_ERROR.xml" to the state monitoring application. The state monitoring application that runs on the CPU 100 reads a situation category and a state from the received situation information data="FAXLINE_ERROR.xml". The state monitoring application then checks the current situation of the situation category="LINE" and displays, on the touch panel 200, a screen providing a guidance for resolving the situation in step S1303. FIG. 21 illustrates a state monitoring application screen displayed with the situation of the error record 517 reflected therein.

As described above, the integrated history 509 enables the user to display a desired situation with a one touch button.

Similarly, the user is enabled to display information about the copy application in each of the states of FIG. 8B and FIG. 15B with a single button. A description of this operation will be provided below.

When the user presses the error record 518 in the integrated history 509, the integrated history 509 that runs on the CPU 100 reads out, from the data table in FIG. 15B for the integrated history 509 that is saved in the HDD 103, data for a history record of the button ID=1004 that has been pressed. The integrated history 509 determines, from the application ID=101 in the read history record data, that a target application is the copy application. In step S1302, the integrated history 509 sends the situation information data="STAPLEOVER.xml" to the copy application. The copy application that runs on the CPU 100 reads a situation category and a state from the received situation information data="STAPLEOVER.xml". In step S1303, the copy application then displays a screen suitable for the situation category="execution" and the state="Too many sheets to staple" on the operation unit 12. FIG. 8B illustrates a state monitoring application screen displayed with the situation of the error record 518 reflected therein.

Figure 8C:
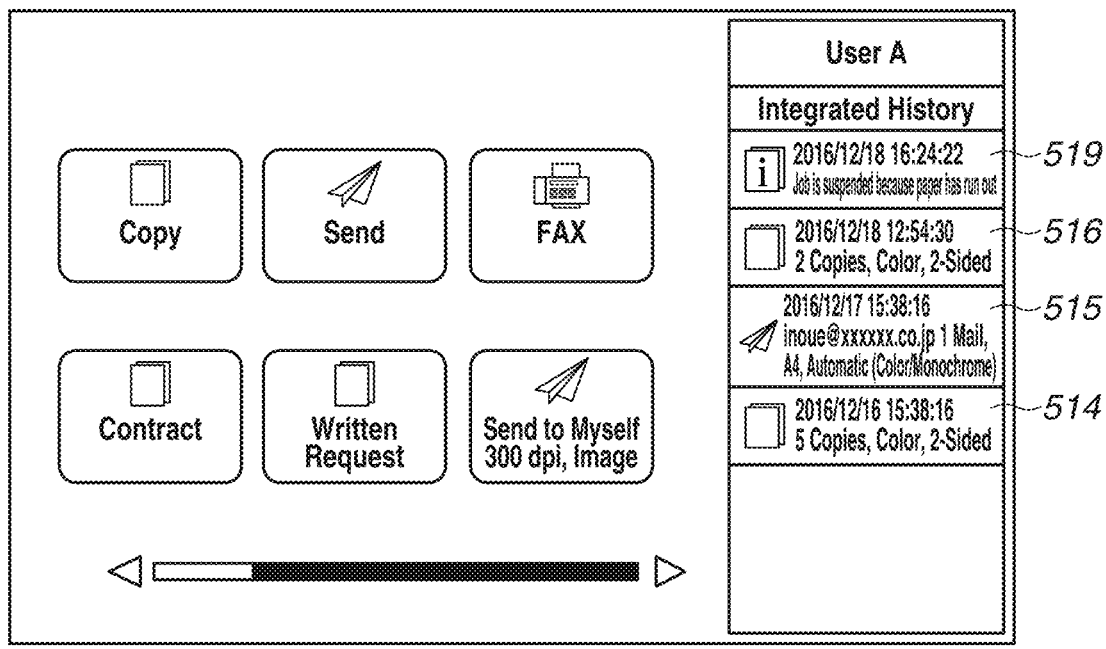
Figure 11A:
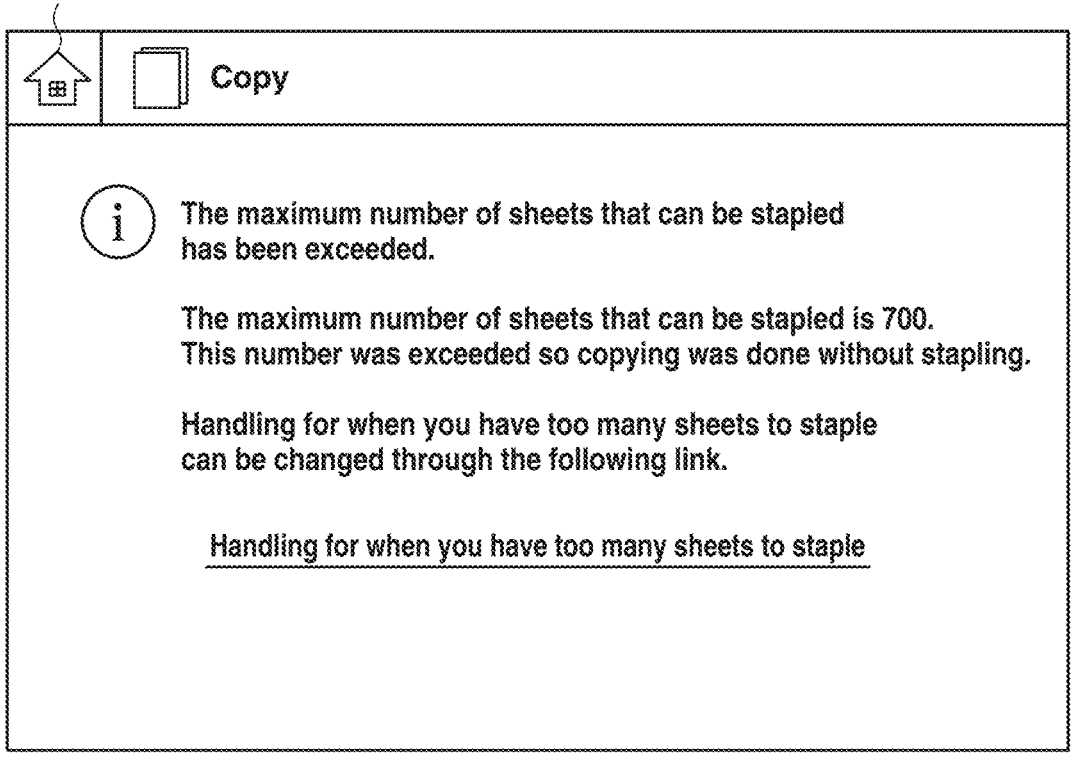
FIGS. 11A and 11B are schematic views of an error screen.
Figure 11B:
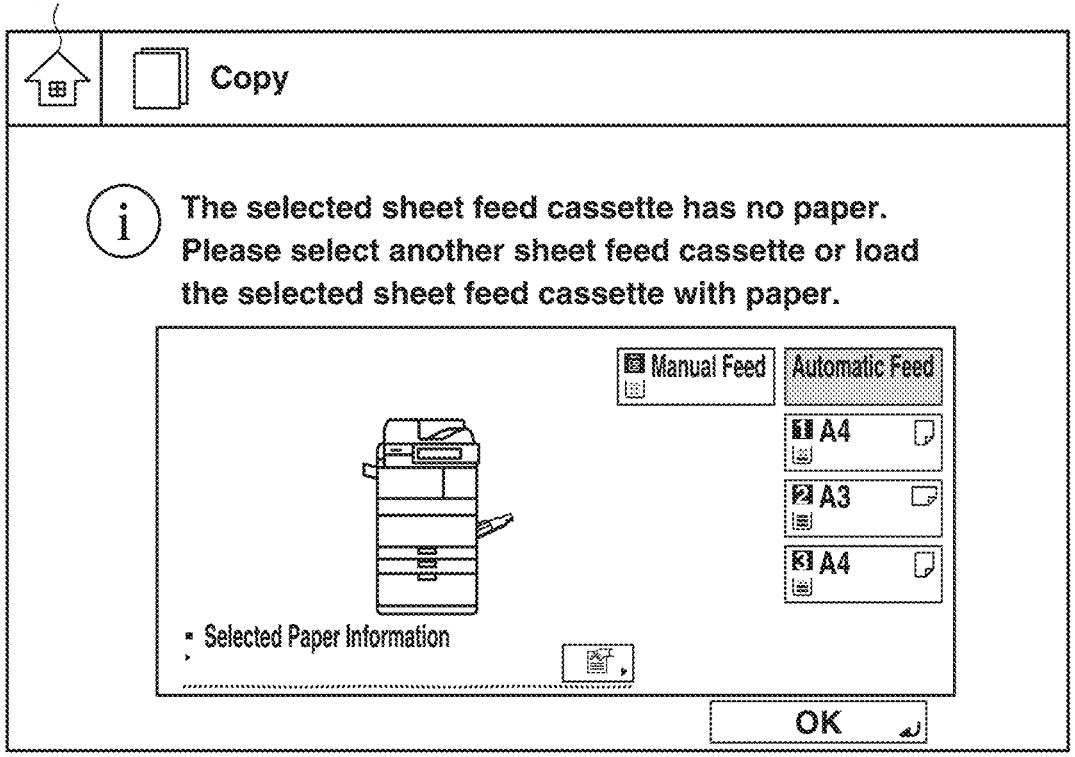

If a copy job is being suspended Job because paper has run out, the copy application generates a situation category="execution", a state="out of paper", a state category="suspended" (1408), whereby the integrated history data become as illustrated in FIG. 15C and a screen in FIG. 8C is displayed. In FIG. 8C, an error record 519 is displayed in priority to the other history records 514 to 516 and in a position higher than positions at which the history records 514 to 516 are displayed. The error record 519 contains, in the left part thereof, the icon that indicates an error. When the user selects this error record 519, the copy application displays a sheet feed cassette selection screen as illustrated in FIG. 11B. If the user then specifies a sheet feed cassette containing paper or loads the selected sheet feed cassette with paper, the copy application determines that the out-of-paper state has been resolved and starts the suspended copy job. At the same time, as already described above, since the out-of-paper state has been resolved, the copy application detects this situation change in step S907 and accordingly requests the integrated history 509 to delete the situation information, and the processing ends with further process not being performed, as the situation has been resolved. Thus, the integrated history data becomes the screen as illustrated in FIG. 14E, and the home screen becomes the screen as illustrated in FIG. 7A, which enables the user to recognize that there is no situation that the user needs to deal with.

Next, operations of registration to and deletion from a menu of the integrated history 509 will be described.

Figure 7B:
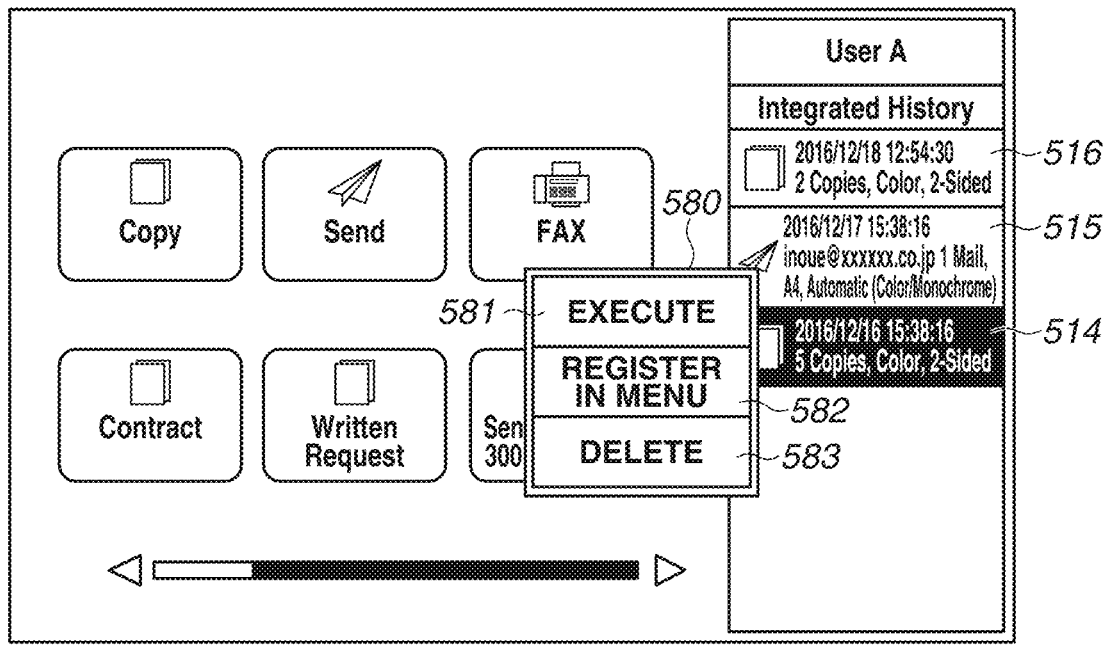

Each button displayed in the integrated history 509 functions to display a context menu 580 for the button itself as illustrated in FIG. 7B when the user performs a pressing and holding operation on the button. Although the pressing and holding operation is taken as an example of a user operation for displaying the context menu 580, a method for calling up the context menu 580 is not limited to the pressing and holding operation and may be a double tapping operation, the arrangement of a call-up button, or the like. The context menu 580 provides, as operations on each button in the integrated history 509, context menu options such as "Execute" 581, "Register in Menu" 582, and "Delete" 583.

When the "Execute" 581 is selected in FIG. 7B, the CPU 100 performs processing for calling up a corresponding application as already described with reference to FIG. 18. When the "Register in Menu" 582 is selected in FIG. 7B, the CPU 100 performs processing for registering a custom button, as a new button, in the menu 500 in the left-hand side. Possible processing for determining the position of the button to be registered is to set the button in a blank space within the menu 500 or to cause the user to select the position.

When the "Delete" 583 is pressed by the user in FIG. 7B, the CPU 100 executes processing for deleting a selected history record. The CPU 100 deletes the target record from the data table in which history records are arranged in chronological order and the data table for the integrated history 509, and executes sorting of the remaining history records by date and time thereof.

If the CPU 100 determines that a selected button in the integrated history 509 is not a button for setting but a button for situation information, the CPU 100 does not display the "Register in Menu" 582 on the menu 580 and displays only the "Execute" 581 and the "Delete" 583.

Next, a description will be provided of a case in which the number of history records or error records on the integrated history 509 has reached an upper limit.

When the upper limit for the number of history records that can be saved in the integrated history 509 is reached after jobs with different settings have been repeatedly executed, the CPU 100 performs processing for deleting history records sequentially from the data table in chronological order. This upper limit is the upper limit for the storage area and is not necessarily the same as the upper limit for the display area. This is because the upper limit for the display area is variable depending on configurations, such as the sizes and/or the layouts of buttons and functions, such as whether a screen is made scrollable with a slider bar or by flicking.

According to the present exemplary embodiment, the user is enabled to check a history of jobs with history records on a screen with which the user is able to select the copy function and the send function, and easily check, with an error record, whether an error has occurred. Moreover, according to the present disclosure, an error record is displayed in priority to history records and in a position higher than positions at which the history records are displayed, which enables the user to be easily aware of the error when an error has occurred. The error record is displayed with date and time when error has occurred, which makes it easier for the user to check when the error has occurred, with the error record.

A second exemplary embodiment of the present disclosure will be described below. In the present exemplary embodiment, a description will be provided of processing for image processing apparatuses to share the above described integrated history data.

Figure 22:
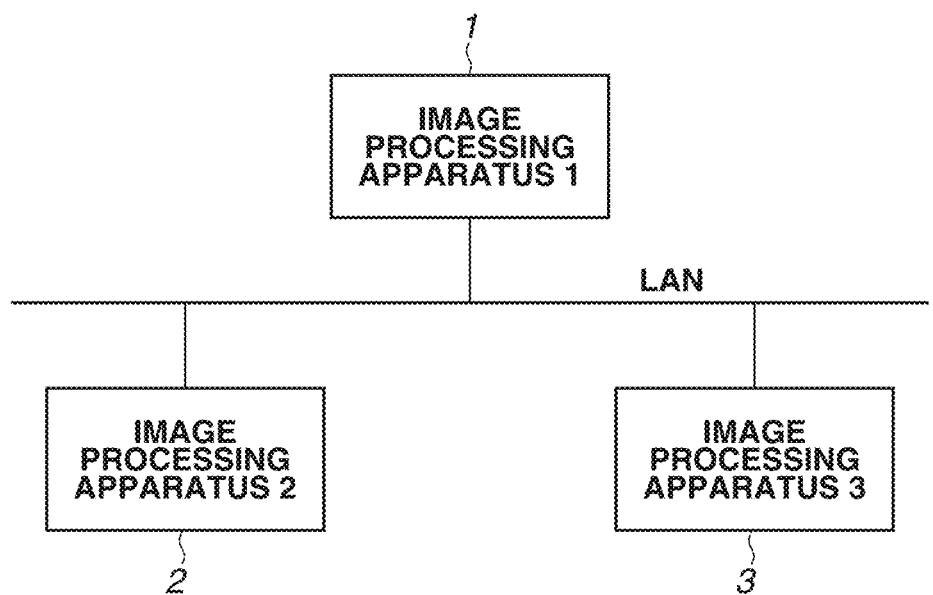
FIG. 22 is a relationship diagram between image processing systems.

FIG. 22 schematically illustrates the relationship among image processing apparatuses.

An image processing apparatus 1, an image processing apparatus 2, and an image processing apparatus 3 each have the functions as described above and are connected to one another via a LAN as illustrated.

The authentication described with reference to FIG. 3 is also linked among one another, and a user who can be authenticated by the image processing apparatus 1 can also be authenticated as the same user by the image processing apparatuses 2 and 3. In this example, the image processing apparatus 1 also serves as an authentication server function.

Assume that the user A is browsing the screen of FIG. 8A on the image processing apparatus 1 and the integrated history data 509 is in the state in FIG. 15A. If the user A is logged in to the image processing apparatus 2 in this state and a setting for identifying a user is "ON" on the image processing apparatus 2, the CPU 100 in the image processing apparatus 2 displays an authentication screen on the touch panel 200 (step S301) after the main body of the image processing apparatus 2 is started up. FIG. 4 illustrates the authentication screen displayed on the image processing apparatus 2. The authentication screen includes areas for inputting a username 401 and a password 402. After displaying the authentication screen, the image processing apparatus 2 enters into a state waiting for input of the username and the password (step S302). When the user inputs previously registered username and password and presses the OK button 403, the CPU 100 sends this information to the image processing apparatus 1. The image processing apparatus 1 compares the input username and password with usernames and passwords saved in the HDD 103, thereby determining whether the received username and password match any of the saved usernames and passwords (step S303). If the username and password do not match any of them, the image processing apparatus 1 returns an authentication error to the image processing apparatus 2 (step S304). In response to receiving the authentication error, the CPU 100 of the image processing apparatus 2 displays an error message on the touch panel 200 and displays the authentication screen again (step S305). If the image processing apparatus 1 determines that the received username and password match any of the saved usernames and passwords, the CPU 100 of the image processing apparatus 1 calls up information that is associated with the user and is saved in the HDD 103, and sends the information to the image processing apparatus 2 (step S306). In this sending, if history information data is to be sent to another apparatus, the data to be sent is generated in accordance with the processing of the flowchart illustrated in FIG. 23. In step S1801, a read position [i] of the history information data and a write position [j] of the data to be sent are initialized to zero. In step S1802, the CPU 100 of the image processing apparatus 1 checks whether data [i] in the history information data is present. If the CPU 100 determines that the data [i] is present (YES, in step S1802), the processing proceeds to step S1803. In step S1803, the CPU 100 reads the data [i]. In step S1804, the CPU 100 checks whether the data type thereof is "setting". If the CPU 100 determines that the data type is "setting" (YES, in step S1804), the processing proceeds to step S1805. In step S1805, the CPU 100 sets the read data [i] to transfer data [j]. In step S1806, the CPU 100 increments, by one, the read position [i] of the history information data and the write position [j] of the data to be sent. If the CPU 100 determines that the data type is not "setting" (NO, in step S1804), the processing proceeds to step S1807. In step S1807, the CPU 100 increments the read position [i] of the history information data by one. Thereafter, the processing proceeds to step S1802. In step S1802, the CPU 100 checks whether data [i] corresponding to the read position [i] in updated history information data is present. If the CPU 100 determines that the data [i] to be read out is not present (No, in step S1802), the processing proceeds to step S1808. In step S1808, the CPU 100 sends the data to be sent. In response to completion of call-up of the information associated with the user, the CPU 100 of the image processing apparatus 2 permits login of the user (step S307), and saves the information as information about a currently logged-in user in the HDD 103 in the image processing apparatus 2 (step S308). Thereafter, the CPU 100 of the image processing apparatus 2 displays, on the touch panel 200, a home screen in which the information on the logged-in user is reflected (step S309). At this point of time, the history information data about the user A in the image processing apparatus 2 is the data as illustrated in FIG. 14E, and the screen in FIG. 7A is displayed as the home screen for the user A.

After the user A logs out, the image processing apparatus 2 sends user information about the user A to the image processing apparatus 1 so that user information of the user A can be updated.

According to the present exemplary embodiment, the image processing apparatuses can share the above-described integrated history data, history records and error records can be checked even when a different image processing apparatus is used.

A third exemplary embodiment of the present disclosure will be described below. In the above-described exemplary embodiments, the setting data and the situation information data are managed in a similar manner and are equally categorized by data type. In the present exemplary embodiment, an example in which the situation information data are completely deleted when the user logs out is illustrated.

Only differences from the first exemplary embodiment will be described below.

Referring now to the flowchart in FIG. 24, in response to receiving a log-out instruction, in step S1901, the CPU 100 initializes a read position [i] of the history information data and a write position [j] of the data to be saved to zero. In step S1902, the CPU 100 checks whether data [i] in the history information data is present. If the CPU 100 determines that the data [i] is present (YES, in step S1902), the processing proceeds to step S1903. In step S1903, the CPU 100 reads the data [i]. In step S1904, the CPU 100 checks whether the data type thereof is "setting". If the CPU 100 determines that the data type is "setting" (YES, in step S1904), the processing proceeds to step S1905. In step S1905, the CPU 100 sets the read data [i] to the saved data [j]. In step S1906, the CPU 100 increments, by one, read position [i] of the history information data and the write position [j] of the saved data. If the CPU 100 determines that the data type is not "setting" (NO, in step S1904), the processing proceeds to step S1907. In step S1907, the CPU 100 increments by one the read position [i] of the history information data. The processing then proceeds to step S1902. In step S1902, the CPU checks whether data [i] corresponding to the read position [i] in updated history information data is present. If the CPU 100 determines that the data [i] to be read is not present (No, in step S1902), the processing proceeds to step S1908. In step S1908, the CPU 100 overwrites the data with the saved data and saves the data. Thus, integrated history data processing at log-out is performed even with the history information data being in the state illustrated in FIG. 15B or FIG. 15C, whereby data 1006 the data type of which is not setting is not saved, and, as a result, the history information data is saved in the state illustrated in FIG. 14E.

When the user logs in again, situations that are managed by each of the applications are registered in the integrated history 509. If the history information data before the log-out is data illustrated in FIG. 15A and the situation thereof is unchanged, the state monitoring application for the entire apparatus registers data similar to the data 1006 as a new situation occurring at that point, as in the processing described in the first exemplary embodiment. However, the date and time for the new situation is recorded as those when it has been detected as a new situation.

If the history information data before log-out is data illustrated in FIG. 15B, a situation having too many sheets to staple in a copy job has not occurred, and the copy application does not register the situation. The history information data therefore starts from the state in FIG. 15B.

According to the present exemplary embodiment, the situation information data is completely deleted when the user logs out, which eliminates the need to re-display situations once checked by the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

What is claimed is:

1. A job processing apparatus which includes at least one function, comprising:

a display configured to display, in an operation screen, a first display object for calling a setting content of a job of a function to be executed; and a controller that detects an error, wherein, in a case where the controller detects the error, the display displays a second display object corresponding to the error, as a display object different from the first display object, side by side with the first display object in the operation screen.

2. The job processing apparatus according to claim 1, further comprising:

a memory configured to store a setting content of a job of a function to be executed, wherein the display displays a first display object for calling the setting content stored in the memory.

3. The job processing apparatus according to claim 1, wherein the display newly displays first display objects side by side in a first area of the operation screen every time a job is executed.

4. The job processing apparatus according to claim 3, wherein a plurality of first display objects is displayed in chronological order.

5. The job processing apparatus according to claim 1, wherein the display displays a setting screen of a job on which a setting content is reflected in a case where the first display object is selected.

6. The job processing apparatus according to claim 2, wherein the job processing apparatus allows a user to log in to the job processing apparatus, and wherein the display displays the operation screen in response to the job processing apparatus having allowed the user to log in to the job processing apparatus.

7. The job processing apparatus according to claim 6, wherein the display displays a first display object for calling a setting content of a function to be executed by an execution instruction from a user having logged in to the job processing apparatus in a first area of the operation screen to be displayed in response to the user having logged in to the job processing apparatus.

8. The job processing apparatus according to claim 1, wherein the display displays the second display object in priority to a plurality of the first display objects.

9. The job processing apparatus according to claim 1, wherein a language indicating an error content is displayed on the second display object.

10. The job processing apparatus according to claim 1, wherein display of the second display object is ended in response to resolution of the error.

11. The job processing apparatus according to claim 1, wherein an icon indicating a function is displayed on the first display object, and an icon different from an icon indicating the function is displayed on the second display object.

12. The job processing apparatus according to claim 1, wherein a date and time at which the error occurs is displayed on the second display object.

13. The job processing apparatus according to claim 1, wherein, when the second display object is selected by a user, the display displays a guidance for resolving the error.

14. The job processing apparatus according to claim 1, wherein a date and time at which the job is executed is displayed on the first display object.

15. The job processing apparatus according to claim 1, wherein the job is a copy job or a send job.

16. The job processing apparatus according to claim 1, wherein the display newly displays software keys for calling setting contents side by side in a predetermined area of the operation screen every time a job is executed.

17. The job processing apparatus according to claim 16, wherein a plurality of software keys is displayed in chronological order.

18. The job processing apparatus according to claim 1, wherein the first display object is displayed in a first area of the operation screen, and the operation screen includes at least the first area and a second area in which a function key to execute a function is displayed.

19. A method executed by a job processing apparatus which includes at least one function, the method comprising:

displaying, in an operation screen, a first display object for calling a setting content of a job of a function to be executed; and detecting an error, wherein the display displays a second display object corresponding to the error, as a display object different from the first display object, side by side with the first display object in the operation screen.

20. A job processing apparatus which executes a job, comprising:

a display configured to display a software key for calling a setting content of a job to be executed in a predetermined area of an operation screen; and a controller that detects an error based on execution of a job, wherein, in a case where the controller detects the error based on execution of the job, the display does not display the software key for calling a setting content of the job but displays an error record indicating the detected error based on execution of the job side by side with the software key displayed in the predetermined area.

21. The job processing apparatus according to claim 20, wherein the job is a copy job or a send job.

* * * * *